US010306066B2

(12) United States Patent
DiPietro et al.

(10) Patent No.: US 10,306,066 B2
(45) Date of Patent: May 28, 2019

(54) DIRECT ENGAGEMENT AND DEVICE ASSISTED CALLER AUTHENTICATION USING A DYNAMIC PHONE NUMBER

(71) Applicant: SaleMove, Inc., New York, NY (US)

(72) Inventors: Justin DiPietro, New York, NY (US); Daniel Michaeli, New York, NY (US); Carlos Paniagua, New York, NY (US); Urmas Talimaa, Tartu (EE)

(73) Assignee: SaleMove, Inc., New York, NY (US)

( * ) Notice: Subject to any disclaimer, the term of this patent is extended or adjusted under 35 U.S.C. 154(b) by 122 days.

(21) Appl. No.: 15/189,813

(22) Filed: Jun. 22, 2016

(65) Prior Publication Data

US 2016/0373581 A1 Dec. 22, 2016

Related U.S. Application Data

(60) Provisional application No. 62/182,967, filed on Jun. 22, 2015, provisional application No. 62/325,220, filed on Apr. 20, 2016.

(51) Int. Cl.
*H04M 3/51* (2006.01)
*G06F 17/11* (2006.01)
(Continued)

(52) U.S. Cl.
CPC ........ *H04M 3/5191* (2013.01); *G06F 16/958* (2019.01); *G06Q 10/00* (2013.01); *G06Q 30/01* (2013.01); *H04L 12/1813* (2013.01); *H04L 12/1822* (2013.01); *H04L 63/08* (2013.01); *H04L 65/1069* (2013.01);
(Continued)

(58) Field of Classification Search
CPC ............. H04M 3/5191; H04M 7/0012; H04M 3/42068; H04M 3/5166; H04M 3/5235; H04M 2203/408; H04M 2203/6081; H04M 2201/50; H04M 2203/551; H04L 67/02; H04L 65/403; H04L 65/4015; H04L 12/1813; H04L 63/08; H04L 65/1069; H04L 67/2814; H04L 67/327; H04L 12/1822; H04L 61/605; G06Q 10/00;
(Continued)

(56) References Cited

U.S. PATENT DOCUMENTS

| 9,641,674 B1 * | 5/2017 | Steinberg .......... G06F 17/30876 |
| 2005/0123118 A1 * | 6/2005 | Terry .................... H04M 3/436 |
| | | 379/211.02 |

(Continued)

*Primary Examiner* — Harry S Hong
(74) *Attorney, Agent, or Firm* — Volpe and Koenig, P.C.

(57) ABSTRACT

Embodiments may include apparatuses, computer readable mediums, and methods to directly connect and engage a visitor to a custom website or application with an operator. In addition, an authentication of visitor's identity entered into an inter-enabled device may be confirmed and carried through to a call center. In an embodiment, a dynamic phone number may be allocated to the visitor. The dynamic phone number may be displayed on the custom website in the visitor's browser when a visitor lands on the custom website or when the visitor authenticates his or her identity through the custom website. When a visitor calls the dynamic number from any device, the call may be directed from a back-end service to an Interactive Voice Response system (IVR), where the visitor may be connected to an operator without additional authentication steps.

19 Claims, 32 Drawing Sheets

(51) Int. Cl.
*H04L 29/12* (2006.01)
*H04M 3/523* (2006.01)
*H04M 7/00* (2006.01)
*H04M 3/42* (2006.01)
*H01L 29/06* (2006.01)
*H04N 7/14* (2006.01)
*H04L 29/08* (2006.01)
*H04L 29/06* (2006.01)
*G06F 16/958* (2019.01)
*G06Q 10/00* (2012.01)
*H04L 12/18* (2006.01)
*G06Q 30/00* (2012.01)

(52) U.S. Cl.
CPC ........ *H04L 65/403* (2013.01); *H04L 65/4015* (2013.01); *H04L 67/02* (2013.01); *H04L 67/2814* (2013.01); *H04L 67/327* (2013.01); *H04M 3/42068* (2013.01); *H04M 3/5166* (2013.01); *H04M 3/5235* (2013.01); *H04M 7/0012* (2013.01); *H04M 2203/408* (2013.01); *H04M 2203/6081* (2013.01)

(58) Field of Classification Search
CPC ... G06Q 30/01; G06F 17/3089; G06F 16/958; G06F 17/2247; H04N 7/147
USPC .................................................. 379/265.09
See application file for complete search history.

(56) References Cited

U.S. PATENT DOCUMENTS

| | | | |
|---|---|---|---|
| 2010/0322404 A1* | 12/2010 | Coleman | H04M 3/42068 379/220.01 |
| 2012/0300916 A1* | 11/2012 | Woicke | H04M 3/5235 379/201.12 |
| 2014/0219438 A1* | 8/2014 | Brown | H04M 3/5191 379/265.09 |
| 2014/0314215 A1* | 10/2014 | Duva | G06Q 30/0202 379/88.01 |
| 2015/0281450 A1* | 10/2015 | Shapiro | H04M 3/4878 379/265.09 |

* cited by examiner

DIRECT ENGAGEMENT AND DEVICE ASSISTED CALLER AUTHENTICATION USING A DYNAMIC PHONE NUMBER

CROSS REFERENCE TO RELATED APPLICATIONS

This application claims the benefit of U.S. Provisional Application No. 62/182,967 which was filed on Jun. 22, 2015 and U.S. Provisional Application No. 62/325,220 which was filed on Apr. 20, 2016, the contents of which are hereby incorporated by reference herein.

TECHNICAL FIELD

The disclosed embodiments are generally directed to web browsing and telephonic support, and in particular, using a dynamic phone number assigned to a visitor of a web site or application, such as, but not limited to web applications, native mobile applications, and/or desktop applications. In one embodiment, the dynamic number may be used to initiate an engagement between one or more operators and one or more visitors during browsing. In another embodiment, the dynamic number may be allocated to a user upon authenticating his or her identity to pass that authentication on to a telephone operator.

BACKGROUND

Often, a visitor to a website or application needs assistance. For example, often a visitor to a website that offers products for sale needs help in a similar way as a visitor to a brick and mortar store needs assistance. In addition, a visitor to a website or application may be required log in and/or authenticate his or her identity to access a restricted or private section of website or application. The visitor may require help with a matter that pertains to the restricted or private information being accessed. One way to assist the visitor in these matters is to permit an operator of the website to engage with the visitor.

However, many engagement solutions do not provide a pleasant visitor experience. For example, engagement is often achieved by sending back and forth the images of the screens of the visitor and operator, but this method often results in delays in the response time of the user interface and degradation in the quality of the displayed screen.

Another engagement solution may involve a visitor calling a service number to talk with an operator in a call center. However, this may lead to inconveniences such as inefficient operator utilization, wait times, additional authentication steps, and a complicated explanation of what the visitor is experiencing. In addition, this may pose a security risk, as conventional authentication methods used over the phone may not be as robust on those used on the device used to access the website or application. An operator may be vulnerable to social engineering tactics that may lead to the disclosure of information that non-entitled recipients may then use to gain access to the private or restricted information. Therefore, there is a need for an apparatus, a non-transitory computer-readable medium, and a method of efficiently carrying user authentication validated through a device to the call center.

SUMMARY

The following description includes methods, systems, and apparatuses for initiating an engagement session between a visitor of a custom website and an operator. Embodiments may include: allocating, by a back-end service, a dynamic phone number that is specific to the visitor; displaying, by the back-end service, a dynamic number on the custom website or application, such that is viewable on an internet-enabled device of the visitor; receiving, at an application program interface (API) endpoint, a call to the allocated dynamic phone; identifying, by the back-end service, the visitor by the allocated dynamic phone number; assigning, by the back-end service, the visitor to an available operator; providing, by the back-end service, the operator with information about the visitor and the visitor's activity within the custom website or application gathered from an engagement service; and connecting, by the back-end service, the visitor to the operator.

The description may also include methods, systems, and apparatuses for verifying a caller's identity using authentication information provided to an internet-enabled device by the caller. Embodiments may include: allocating, by a back-end service, a dynamic phone number that is specific to the visitor; displaying, by the back-end service, a dynamic number on the custom website, such that is viewable on an internet-enabled device of the visitor; receiving, at an API endpoint, a phone call from the caller's original number to the dynamic phone number; forwarding, by the back-end service, the caller's original number and the dynamic phone number to an interactive voice response system (IVR); receiving, by the back-end service, a request for information from the IVR, wherein the request contains at least the dynamic number; determining, by the back-end service, that the dynamic number is allocated to the visitor and that the visitor is active; and sending, by the back-end service, a successful response to the IVR containing information from the visitor's internet-enabled device to be used for verification of the caller.

Embodiments may also include: allocating, by a back-end service, a dynamic phone number that is specific to the visitor; displaying, by the back-end service, a dynamic phone number in a custom website after the visitor's identity has been authenticated through the internet-enable device, wherein the dynamic phone number is displayed only to the visitor; receiving, at an application program interface (API) endpoint, a phone call from the caller's original number to the dynamic phone number; gathering, by the back-end service, the visitor's identification information from the visitor's activity on the custom website based on the allocated dynamic phone number; and forwarding, by the back-end service, the caller's original number, the dynamic phone number, and the visitor's identification information to an IVR to perform matching and verification.

BRIEF DESCRIPTION OF THE DRAWINGS

A more detailed understanding may be had from the following description, given by way of example in conjunction with the accompanying drawings wherein.

DETAILED DESCRIPTION

Figure 1:
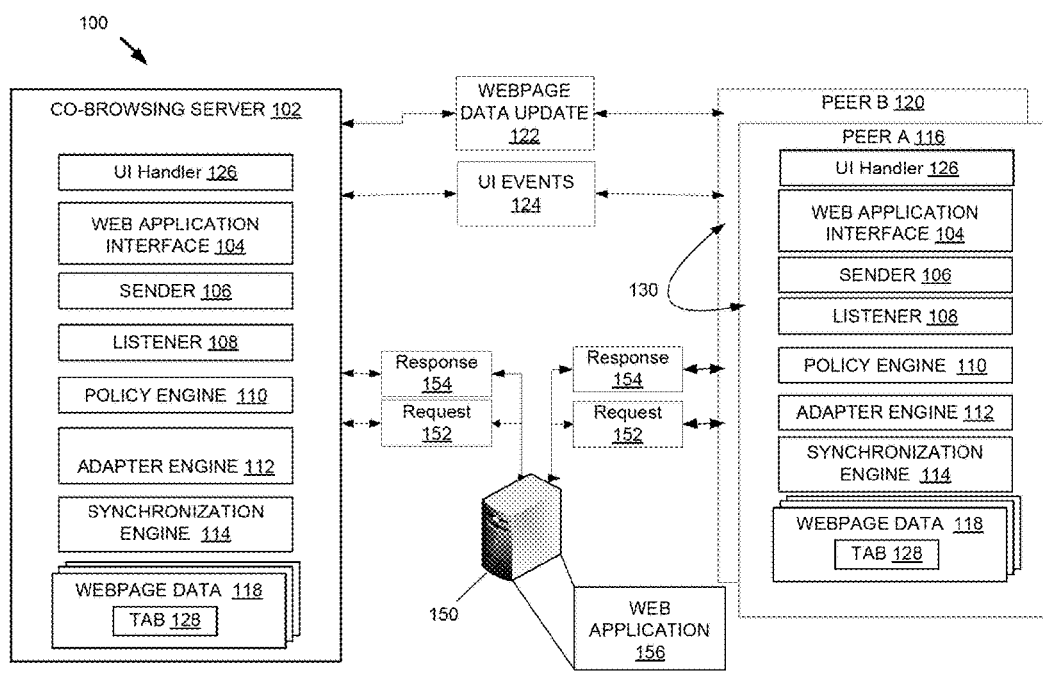
FIG. 1 schematically illustrates a system for co-browsing, which may include multi-tab co-browsing.

When a visitor lands on a web site or uses an application such as, but not limited to web applications, native mobile applications, and/or desktop applications, the visitor may look for help or additional information. In addition, the visitor may be required to authenticate his or her identity in order to access private or restricted material. The user authentication may be performed using conventional one-factor or two-factor methods for identification verification that may involve entering a password or pattern or using biometrics.

In some instances, the visitor may want to contact the company via a telephone call to a call center. Typically, this may require the visitor to once again authenticate his or her identity to either an automated system or an operator. In some instances, the automated system and/or operator may have little or no access to the visitor's online authentication.

Embodiments described herein may allocate a dynamic phone number to the visitor that may be displayed on, or replace a default phone number of, a custom web site or application. In an embodiment, dialing this dynamic number may automatically connect the visitor's browser to an operator, who may be able to view and/or co-browse with the visitor. In another embodiment, the dynamic number may only be assigned after the visitor authenticates his or her identity through the custom web site or application. After this, the visitor may call the dynamic phone number and the electronic authentication may be carried over to the call center.

This method of device assisted authentication may eliminate the need for callers to have to identify themselves and/or answer costly additional security questions when calling a call center. This may increase the efficiency of operators because they may be able to spend less time authenticating callers' identities and more time assisting the callers. In addition, because the operators may no longer need to authenticate a caller's identification, they may be at less of a risk of social engineering from non-entitled entities aimed at gathering information on an account. In short, it may allow a company's call center authentication to be as strong as their online or device authentication.

As described in detail below with reference to FIGS. 1-28, embodiments may include apparatuses, non-transitory computer-readable mediums, and methods of provisioning specific dynamic phone numbers for visitors to a custom website or application, identifying callers based on the dynamic phone number, determining if the caller has authenticated his or her identity through the custom website, and carrying that authentication to a call center. It should be noted that embodiments described below may use a website and web browser as an example exchanging data for the use of co-browsing, but embodiments in which data is exchanged through a mobile browser or an application, such as web applications, native mobile applications, and/or desktop applications are considered.

FIG. 1 schematically illustrates an example of a system 100 that may be used for co-browsing, which may include multi-tab co-browsing, between the visitor and the operator. The system 100 includes a co-browsing server 102, the custom website 150, peer A 116, peer B 120, webpage updates 122, user interface (UI) events 124, requests 152, and responses 154. The co-browsing server 102 may include a user interface (UI) handler 126, a web application interface 104, sender 106, listener 108, a policy engine 110, an adapter engine 112, a synchronization engine 114, and webpage data 118. Peers A 116 and B 120 may include a UI handler 126, a web application interface 104, sender 106, listener 108, a policy engine 110, an adapter engine 112, a synchronization engine 114, and webpage data 118. Peers 116, 120 and co-browsing server 102 may not include some of the functionality and modules disclosed.

Peer A 116 may send and receive webpage data updates 122 and/or UI events 124. Peer B 120 may send and receive webpage data updates 122 and/or UI events 124. The co-browsing server 102 may receive webpage updates 122 and/or UI events 124 from peer A 116 or peer B 120, and, in response, send webpage data updates 122 and/or UI events 124 to peer A 116 or peer B 120. The co-browsing server 102 may process the webpage data updates 122 and UI events 124 before sending them to peer A 116 or peer B 120.

The co-browsing server 102 may be a remote procedure call (RPC) server 102. The co-browsing server 102 may be more than one server. The functions described in relation to the co-browsing server 102 may be provided by one or more co-browsing servers 102. In some embodiments, peer A 116 and peer B 120 may send some or all of the webpage updates 122 and UI events 124 directly to one another.

Peer A 116 and peer B 120 may be computing devices. Peer A 116 and peer B 120 may be peers to one another or may have a master slave relationship. Peer A 116 and peer B 120 may be on separate computing devices or on a same computing device. A person (not illustrated) may be a user of peer A 116 or peer B 120. The user may be the visitor (not illustrated) to a custom website 150 or may be the operator (not illustrated) of the custom website 150. An operator (not illustrated) of the custom website 150 may be using either peer A 116 or peer B 120. A visitor (not illustrated) of the custom website 150 may be using either peer A 116 or peer B 120. There may be more than one peer A 116 and more than one peer B 120. In some embodiments, Peer A 116 and/or peer B 120 may include an automation module (not illustrated) that may generate events (not illustrated). For example, in some embodiments, an operator module may be included that co-browses with the visitor.

The requests 152 may be requests 152 to the web application 156 from peer A 116, peer B 120, or co-browsing server 102. The responses 154 may be responses from the web application 156 to peer A 116, peer B 120, or co-browsing server 102.

The web application interface 104 may access a web application 156 where peer A 116 and peer B 120 co-browse. For example, the web application interface 104 may be Internet Explorer® (IE) or Chrome®. The web application interface 104 may render webpage data 118 in order to present webpage data 118 to the user.

The webpage data 118 may be data for a webpage such as a document object model (DOM®). The DOM® may include a DOM® application programming interface (API) (not illustrated). The webpage data 118 may include tab 128. The tab 128 may be an indication of which tab 128 of the web application interface 104 that the webpage data 118 represents.

The UI events 124 may be a user interface event recognized by the web application interface 104, or an event (not illustrated) recognized as an event by the web application interface 104. The user interface event may be performed by the visitor or the operator. The event may be an event recognized by the web application interface 104 as an event. An event may include events as defined by the World Wide Web Consortium® (W3C). Events may include UI events 124. Examples of events include a mouse click, mouse movement, a page refresh, and receipt of an event from the web application 156.

The webpage data update 122 may be an update to the webpage data 118. The webpage data update 122 may represent the difference between webpage data 118 before an event and after the event. In some embodiments, the webpage data update 122 is the difference between the current DOM and a previous DOM. The previous DOM may have been updated to the current DOM based on an event (not illustrated). The webpage data update 122 may be sent in a JavaScript Object Notation® (JSON) format, or another format. The webpage update 122 and/or the UI events 124 may include a timestamp to indicate when the update to the webpage data 118 occurred. The webpage update 122 and/or the UI events 124 may include the identification of the intended recipient of the webpage update 122 or UI events. The webpage data update 122 may include Javascripte or another script from another language that was executed on the webpage data 118 as a result of the event. The request 152 sent to the web application 150 as a result of the event may be included in the webpage data update 122. For example, a XMLHttpRequest (XHR) that resulted from the event may be included with the webpage data update 122. In some embodiments, the webpage data update 122 may include a precedence of the peer 116, 120 that sent the webpage data update 122.

The synchronization engine 114 may be configured to determine webpage data update 122 based on webpage data 118 changing as a result of an event. For example, a user may click on a button, which is an event, and the web application interface 104 may send the button click to the web application 156, which returns updates of the webpage data 118. The webpage data 118 may be updated by the web application interface 104. The synchronization engine 114 may determine the difference between the webpage data 118 before the button click and after the button click and generate webpage data update 122 that indicates the difference. The difference may be determined before the webpage data 118 is rendered by the web application interface 104 or after the webpage data 118 is rendered by the web application interface 104.

The synchronization engine 114 may be configured to take the webpage data update 122 and update the webpage data 118 to reflect the webpage data update 122. In some embodiments, the synchronization engine 114 may decode the webpage data update 122 which may be in JSON format and apply the webpage data update 122 to the webpage data 118. In some embodiments, the synchronization engine 114 uses core levels 1, 2, 3, 4, 5, or subsequent level of a DOM API. The synchronization engine 114 may be configured to discard changes to webpage data 118 when a webpage data update 122 is received from a peer 116, 120 with a higher precedence than the peer 116, 120 of the synchronization engine 114, and to make the changes to the webpage data 118 indicated in the webpage data update 122.

A peer 116, 120 or the co-browsing server 102 may be configured to determine which tab 128 a webpage data update 122 or UI events 124 is for. The peer 116, 120 or the co-browsing server 102 may be configured to determine the tab 128 based on activity of the webpage data updates 122 or UI events 124, or the webpage data update 122 or UI events 124 may indicate a tab 128.

The adapter engine 112 may be configured to adapt webpage data updates 122 and UI events 124 for a peer 116, 120 from one format to a second format. For example, webpage data updates 122 from peer A 116 may be in a format for Internet Explorer®, and the adapter engine 112 may adapt the webpage data updates 122 into a format for Chrome® for peer B 120.

The UI handler 126 may be configured to handle UI events 124 and to handle UI events 124 on peer A 116 and peer B 120. The UI handler 126 may be configured to take the UI events 124 and process the UI events 124. For example, peer A 116 may indicate that a user has selected or clicked a button in UI events 124 that is sent to the co-browsing server 102, and then sent to peer B 120. The UI handler 126 may replicate the UI events 124 for the web application interface 104 so that the web application interface 104 mirrors the clicking or selection of the button on peer A 116.

In some embodiments, the UI handler 126 will simulate the UI events 124 so that the web application interface 104 will update the webpage data 118 according to the UI events 124. The synchronization engine 114 may then determine the webpage data update 122 based on the UI events 124 and send the webpage data update 122 to the sender of the UI events 124. In this way, one peer 116, 120 may act as a master peer 116, 120 and another peer 116, 120 may act as a slave peer where the slave peer 116, 120 sends UI events 124 and receives webpage data updates 122, and the master peer 116,120 receives UI events 124 and sends webpage data updates 122. The user of the mater peer 116, 120 may initiate events on the master peer 116, 120 and then send webpage data updates 122 based on the events.

The sender 106 may be a sockets program or a program capable of publishing peer network links that sends webpage data updates 122 and UI events 124. The sender 106 may send requests to the custom website 150. The sender 106 of peer A 116 or peer B 120 may be configured to send webpage data updates 122 and UI events 124 to peer A 116 or peer B 120 directly rather than sending the webpage data updates 122 and UI events 124 to a co-browsing server 102.

The listener 108 may be a sockets program that listens for webpage data updates 122 and UI events 124. In some embodiments, the listener 108 is a program capable of publishing peer network links that listens for webpage updates 122 and UI events 124. The listener 108 may listen for data from the web application 156.

In some embodiments, the peers 116, 120 may set up a socket communication with sender 106 and listener 108. In some embodiments, peers 116, 120 may query other peers 116, 120 for webpage data updates 122 and UI events 124. In some embodiments, peers 116, 120 may communicate 130 with one another without going through the co-browsing sever 102.

The policy engine 110 may be configured to resolve conflicts between peer A 116 and peer B 120 in co-browsing. For example, if peer A 116 and peer B 120 select different items simultaneously or approximately simultaneously or before the updates or event has been processed while co-browsing then the policy engine 110 may determine which, if either, of the selections should be sent to the other peer 116, 120. The policy engine 104 may have precedence where peer A 116 and peer B 120 are ranked. The policy engine 104 may resolve conflicts based on the precedence of peer A 116 and peer B 120.

In some embodiments, the functionality described in user interface (UI) handler 126, web application interface 104, sender 106, listener 108, policy engine 110, adapter engine 112, and synchronization engine 114, may be grouped differently. Additionally, peer A 116, peer B 120, and co-browsing server 102 may include only some of the functionality described. In some embodiments, the functionality may be divided among or between peer A 116, peer B 120, and co-browsing server 102. For example, peer A 116 may partially adapt a webpage data update 122, and the co-browsing server 102 or peer B 120 may partially adapt the webpage data update 122. In another example, peer A 116 may have no adapter engine 112 while peer B 120 and the co-browsing server 102 do have adapter engines 112. In some embodiments, some or all of the functionality of the co-browsing server 102 may be merged with an operator.

In some embodiments, one or more of the user interface (UI) handler 126, web application interface 104, sender 106, listener 108, policy engine 110, adapter engine 112, and synchronization engine 114, may be implemented by including a single line in the web application interface 104. In some embodiments, more than a single line is used. In some embodiments, no installation is necessary beyond adding code to the web application 156. This may provide the advantage that a web application 156 may be enabled for co-browsing according to one or more of the disclosed embodiments by only adding lines to a web application 156.

Figure 2:
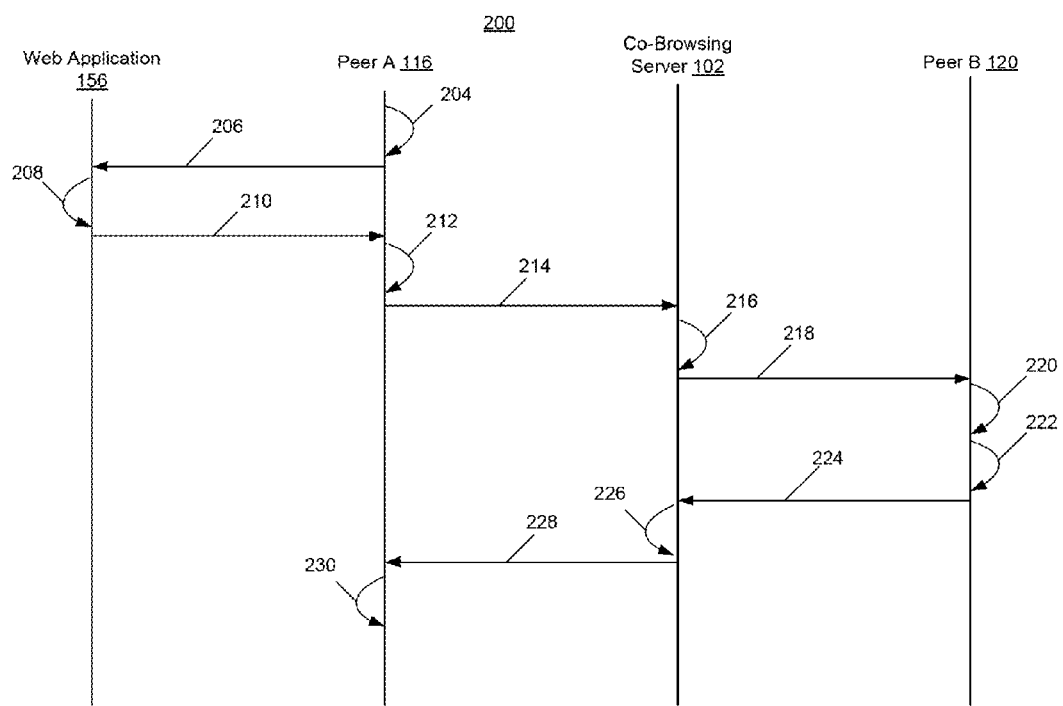
FIG. 2 schematically illustrates an example of the operation of the system for multi-tab co-browsing according to some disclosed embodiments.

FIG. 2 schematically illustrates an example 200 of the operation of the system for multi-tab co-browsing 100 according to some disclosed embodiments. Illustrated in FIG. 2 are web application 156, peer A 116, co-browsing server 102, and peer B 120.

The example 200 is discussed in conjunction with FIG. 1. The example 200 begins at 204 where peer A 116 may make a UI selection such as moving a mouse (not illustrated) over a button and selecting or clicking a button displayed on a webpage (not illustrated). The web application interface 104 of peer A 116 may interpret the moving of the mouse and the selection of the button. The example 200 continues at 206 where peer A 116 sends a hypertext transfer protocol (http) request 152 to the web application 156 that indicates the selection of the button. In some embodiments, the http request 152 may be a hypertext transfer protocol secure (HTTPS). The example 200 continues at 208 where the web application 156 may respond to the http request 152 that indicates the selection of the button by generating an http response 154. The example 200 continues at 210 where the web application 156 may send the http response 154 to peer A 116. The example 200 continues at 212 where the web application interface 104 of peer A 116 may integrate the http response 154 into the webpage data 118 of peer A 116. The web application interface 104 of peer A 116 may add two new buttons and remove an image as a result of the button selection. Continuing at 212, the synchronization engine 114 may determine the difference between the webpage data 118 before the selection of the button and after selection of the button. The synchronization engine 114 may generate webpage data update 122 which indicates the difference between the webpage data 118 before the selection of the button and after selection of the button. The synchronization engine 114 may determine the difference before the new webpage is rendered by the web application interface 104 of peer A 116 or after the new webpage is rendered by the web application interface 104 of peer A 116.

The example 200 continues at 214 where the peer A 116 sends the webpage data update 122 to the co-browsing server 102. The example 200 continues at 216 where the listener 108 of the co-browsing server 102 may receive the webpage data update 122. In some embodiments, the adapter engine 112 of the co-browsing server 102 may adapt the webpage data update 122 for peer B 120. For example, the web application interface 104 of peer B 120 may be IE® and the web application interface 104 of peer A 116 may be Chrome®. The adapter engine 112 of the co-browsing server 102 may adapt the webpage data update 122 from IE® to Chrome®. In some embodiments, the adapter engine 112 of the peer A 116 or peer B 120 may adapt the webpage data update 122 for peer B 120.

The example 200 continues at 218 where the co-browsing server 102 sends the webpage data update 122 to peer B 120. The example 200 continues at 220 where the listener 108 of peer B 120 may receive the webpage data update 122. The synchronization engine 114 of peer B 120 may adapt the webpage data 118 with the webpage data update 122. The web application interface 104 of peer B 120 may then render a new webpage based on the updated webpage data 118. Thus, the changes to the webpage data 118 of peer A 116 may be mirrored in the webpage data 118 of peer B 120.

The example 200 continues at 222 where a user moves a mouse of peer B 120 that moves a cursor to a different location on a screen (not illustrated) of peer B 120. The UI handler 126 generates a UI event 124 that indicates the movement of the cursor. The example 200 continues at 224 with the sender 106 of peer B sending the UI events 124 to the co-browsing server 102. The example 200 continues at 226 with the listener 108 of the co-browsing server 102 receiving the UI events 124. The co-browsing server 102 may adapt the UI events 124 for peer A 116.

The example 200 continues at 228 with the co-browsing server 102 sending the UI events 124 to peer A 116. The example 200 continues at 230 with the listener 108 of peer A 116 receiving the UI events 124. In some embodiments, peer A 116 may adapt the UI events 124 received from the co-browsing server 102 prior to applying them. The UI handler 126 of peer A 116 then may apply the UI events 124 to the webpage data 118 of peer A 116. The UI handler 126 may move the cursor (not illustrated) of peer A 116 to the same position as in peer B 120. In some embodiments, if the UI events 124 sent from peer B 120 to peer A 116 had included events that required changing the webpage data 118, such as a mouse click, then peer A 116 may implement the events in the UI events 124 and send a webpage data update 122 to peer B 120 indicating the changes in webpage data 118 as a result of UI events 124. In some embodiments, the operator, for example peer B 116, and visitor, for example peer A 120, may each have separate cursors so that there may be dual cursors.

Figure 3A:
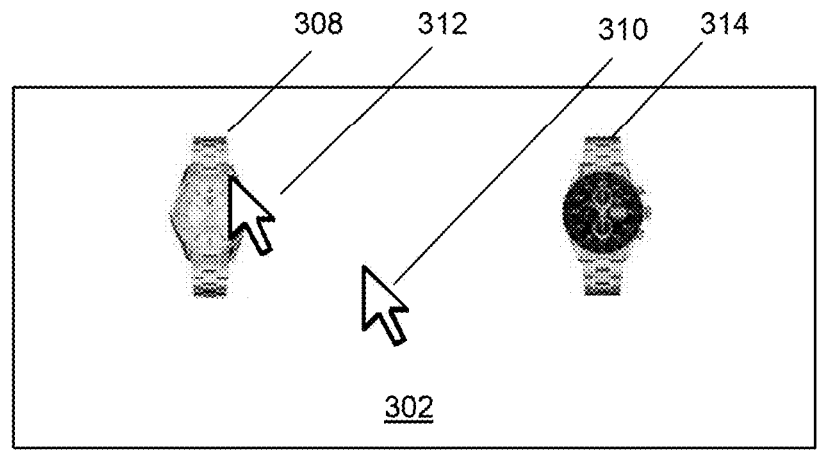
FIGS. 3A, 3B, and 3C schematically illustrate an example of the operation of the system for multi-tab co-browsing according to some disclosed embodiments.
Figure 3B:
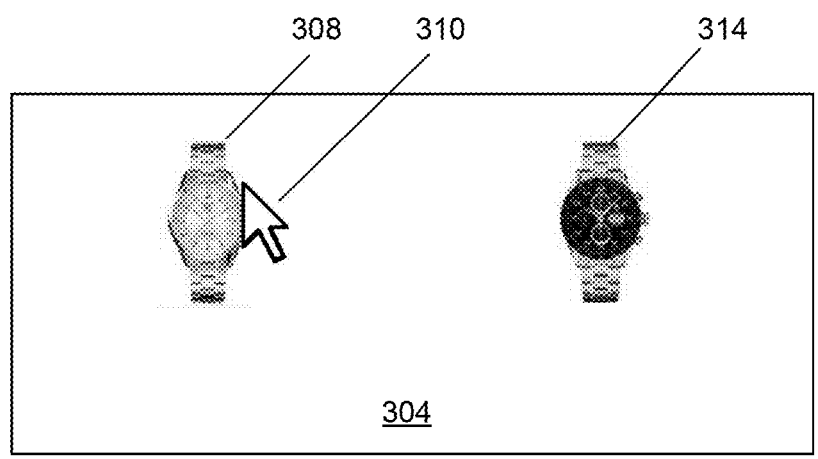
Figure 3C:
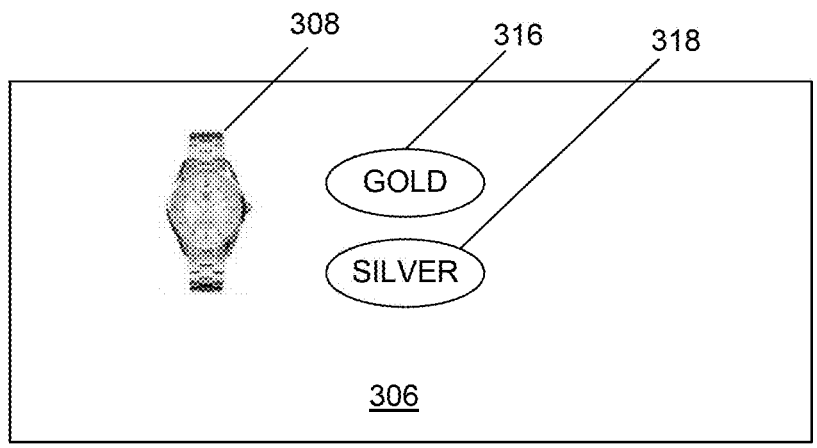

Thus, in the example 200 the changes made to the webpage data 118 of peer A 116 are sent to peer B 120, and UI events 124 may be sent from peer B 120 to peer A 116. In a similar fashion, peer A 116 may send UI events 124 to peer B 120, and peer B 120 may send webpage data 122 to peer A 116. Thus, peer A 116 and peer B 120 may co-browse the web application 156. FIGS. 3A, 3B, and 3C schematically illustrate an example of the operation of the system for co-browsing 100 according to some disclosed embodiments. FIGS. 3A, 3B, and 3C schematically illustrate a webpage 302, 304, 306 of web application 156. FIG. 3A illustrates an image of a first watch 308, a cursor in a first position 310, a cursor in a second position 312, and a second watch 314. The user of the web application 156 may move the cursor from the first position 310 to the second position 312 by, for example, moving a mouse, using a touchpad, using a stylus, or by touching a touchscreen. FIG. 3B illustrates the webpage 302 after the cursor has moved from the first position 310 to the second position 312. The user then selects the first watch 308 by making a selection by, for example, clicking a mouse or touching a touchscreen or touchpad.

FIG. 3C illustrates the first watch 308, a button for selecting gold 316, and a button for selecting silver 318. After the user selects the first watch 308 in FIG. 3B, the webpage 304 is updated by deleting the second watch 314 and adding a button for selecting silver 318, and a button for selecting gold 316.

Figure 4A:
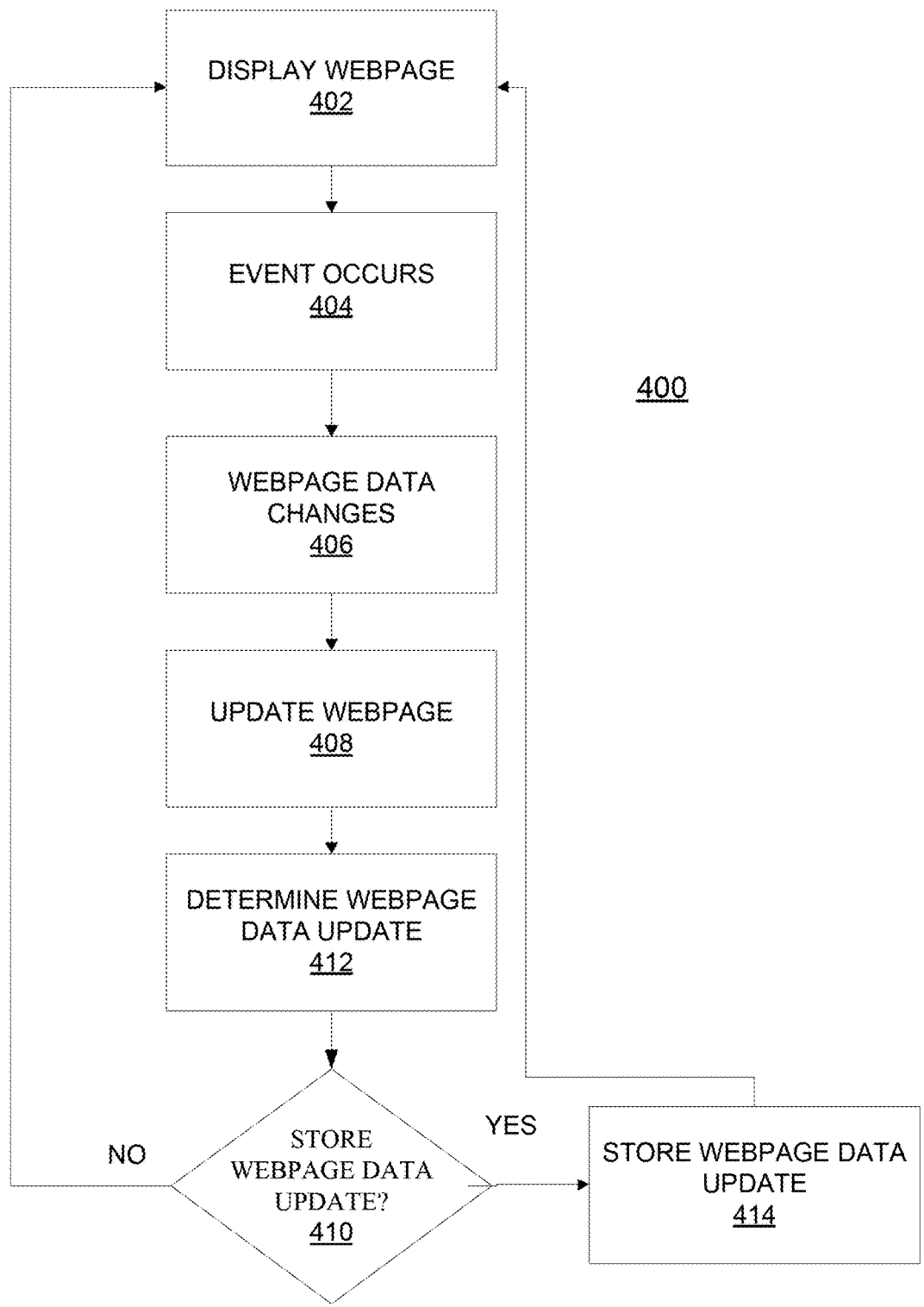
FIGS. 4A and 4B illustrate a method for updating a webpage and storing webpage data updates 122.
Figure 4B:
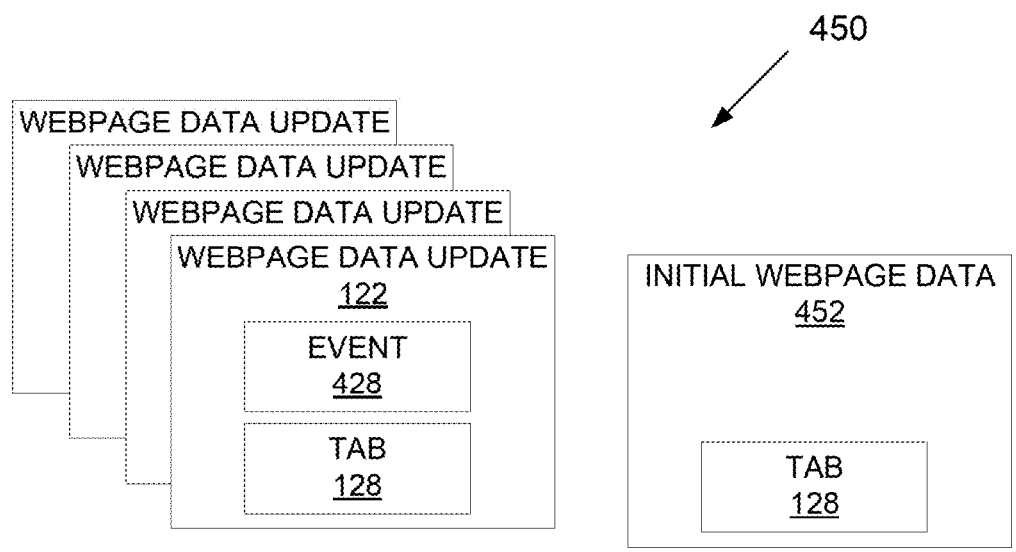

FIGS. 4A and 4B illustrate a method for updating a webpage and storing webpage data updates 122. FIGS. 4A and 4B are discussed in conjunction with FIGS. 3A, 3B, and 3C. Illustrated in FIG. 4B are webpage data updates 122, which may include event 428 and tab 128. The event 428 may be an indication of the event that caused the webpage data update 122 and the tab 128 may be the active tab of the web application interface 104. The method 400 begins at 402 with display webpage 402. A webpage 402 may be displayed by a web application interface 104 with associated webpage data 118. For example, webpage 302 may be rendered from webpage data 118 and displayed for consumption of a user. The method 400 continues at 404 with event occurs. An event 428 has occurred. For example, a user may move the cursor from the first cursor position 310 to the second cursor position 312 (FIG. 3A). In another example, the user may make a selection as illustrated in FIG. 3B. The selection of first watch 308 may invoke one or more requests 152 and responses 154 between the peer 116, 120, and the web application 156. Moving the cursor may not require requests 152 and responses 154.

The method 400 continues at 406 with webpage data changes. For example, the webpage data 118 may be updated to indicate that the cursor position is now the second cursor position 312.

The method 400 continues at 408 with update webpage. The web application interface 104 may render a new webpage based on the webpage data change. For example, the web application interface 104 may render webpage 304 (FIG. 3B) from the updated webpage data 122 (not illustrated).

The method 400 may continue at 412 with determine webpage data update. The webpage data update 122 may be determined by, for example, peer A 116 peer B 120, or co-browsing server 102. The webpage data update 122 may be data that indicates the difference between the webpage 402 and the updated webpage 408. In some embodiments, the webpage data update 412 may be determined based on the difference between the rendered webpages, for example, webpage 302 (FIG. 3A) and webpage 304 (FIG. 3B). In some embodiments, the webpage update 412 may be determined based on the difference between the webpage data 118 and the updated webpage data (not illustrated).

The method 400 continues at 410 with "store webpage update?" The webpage data update 122 may be stored or the method 400 may return to webpage 402. It may be determined whether to store the webpage data update 122 based on how much has changed. For example, in moving the cursor from the first cursor position 310 to the second cursor position 312 many events 428 may have been received. The method 400 may aggregate the changes to the webpage data update 414 to be stored with the next webpage data update 414. The method 400 may determine whether or not how much has changed is above a threshold level. The threshold level may be a predetermined value or determined dynamically based on one or more of storage space, communication time, communication packet size, or delay times.

The method 400 may continue with store webpage data update 414 if it is determined at 410 to store the webpage data update 122. The webpage data update 122 may be associated with a tab 128 of a web application interface 104, and may store one or more events associated with the webpage data update 122 locally. In some embodiments, the webpage data update 122 may be stored by sending the webpage data update 122 to another peer 116, 120 or by sending the webpage data update 122 to the co-browsing server 102.

The method 400 may be carried out by peer A 116, peer B 120, or co-browsing server 102. In some embodiments, portions of the method 400 are carried out by peer A 116 or peer B 120, and the other portions of the method 400 are carried out by co-browsing server 102.

FIG. 4B schematically illustrates webpage data 450 being stored. The webpage data 450 may include webpage data updates 122 and initial webpage data 452. In some embodiments, a webpage data update 122 may be stored for each event 408. In some embodiments, the event 408 may be an indication of multiple events 408. In some embodiments, the webpage data update 122 may be an aggregation of the updates that occurred due to several events 408. For example, in moving a cursor across a screen the webpage 302 data update 122 may represent the entire movement of the cursor from the first position of the cursor 310 to the second position of the cursor 312. And, the event 408 may represent several events 408 of the cursor being moved across the webpage 302, or multiple events 408 may be stored. The initial webpage data 122 may be the webpage data 118 before any events 428 have occurred.

Figure 5:
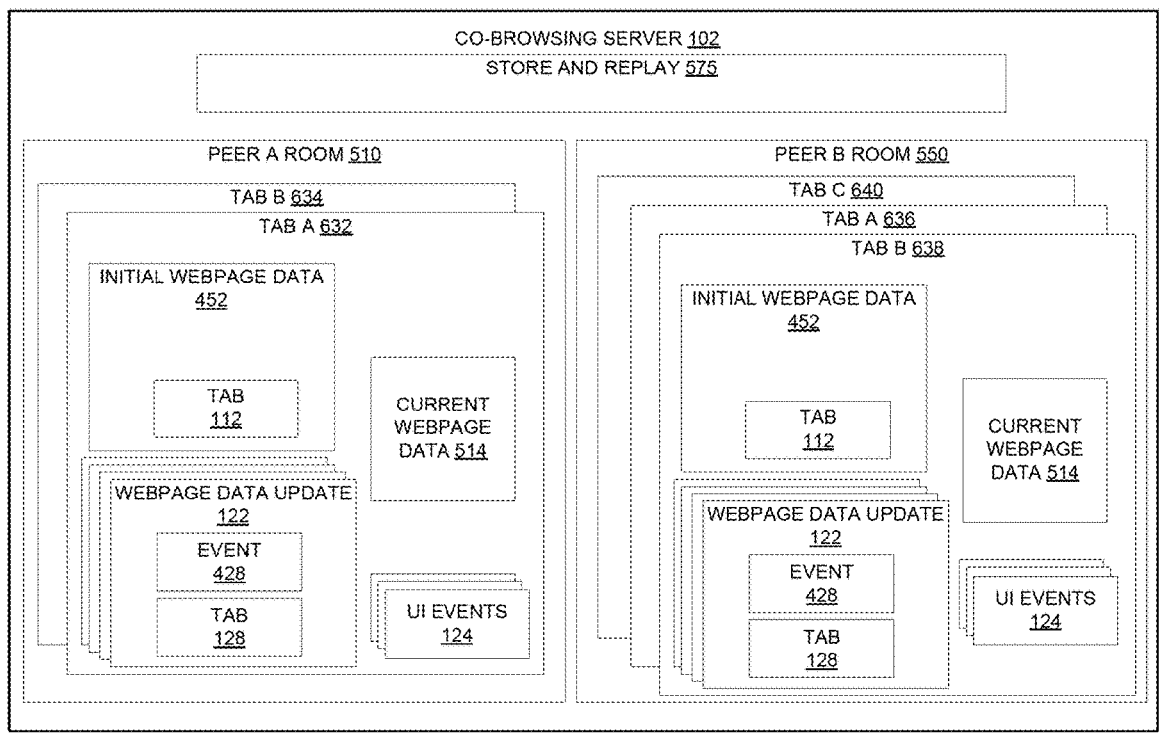
FIG. 5 schematically illustrates the co-browsing server 102 according to some disclosed embodiments.

FIG. 5 schematically illustrates the co-browsing server 102 according to some disclosed embodiments. FIG. 5 illustrates peer A room 510, peer B room 550, and store and replay 575. Peer A room 510 includes tab A 632 and tab B 634. Peer B room 550 includes tab A 636, tab B 638, and tab C 640. Each of tab A 632, tab B 634, tab A 636, tab B 638, and tab C 640 may include initial webpage data 452, webpage data update 122, current webpage data 514, and UI events 124. The current webpage data 514 may be webpage data 118 that indicates the current state of the webpage.

Figure 6A:
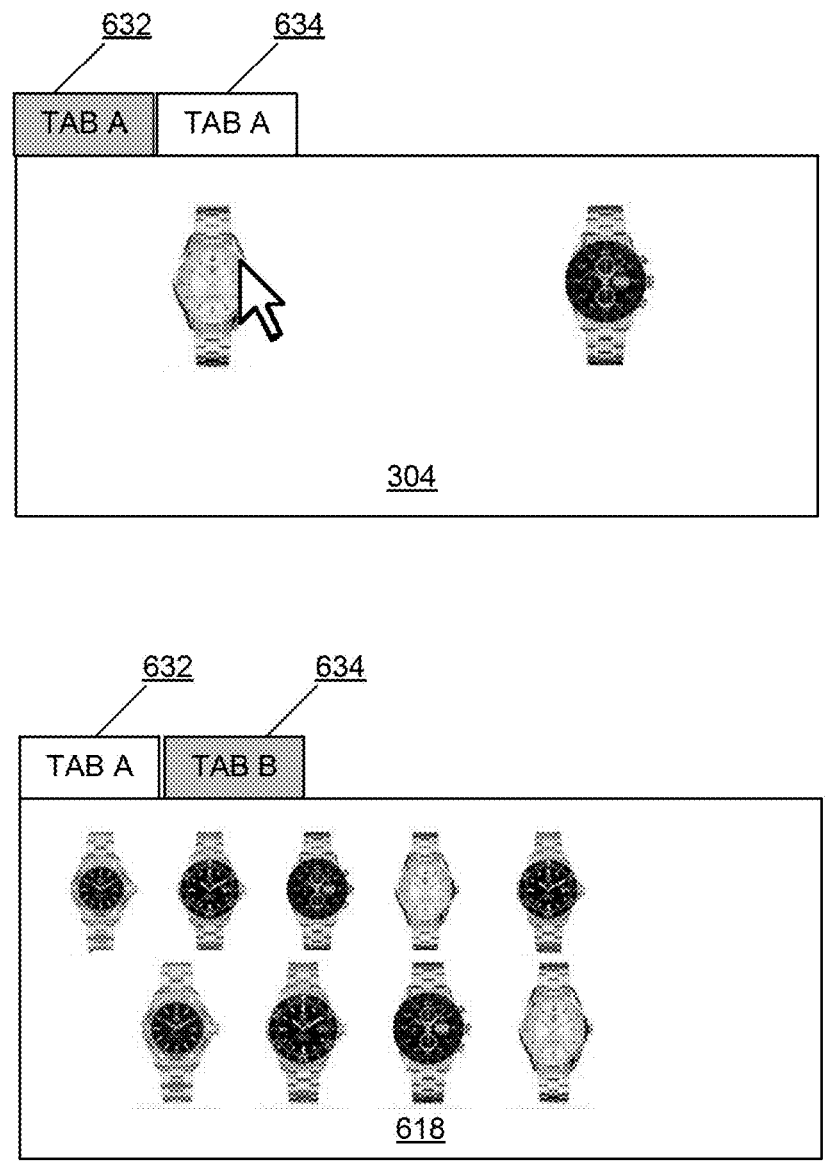
FIG. 6A schematically illustrates the tabs that peer A has opened in one or more web application interfaces.
Figure 6B:
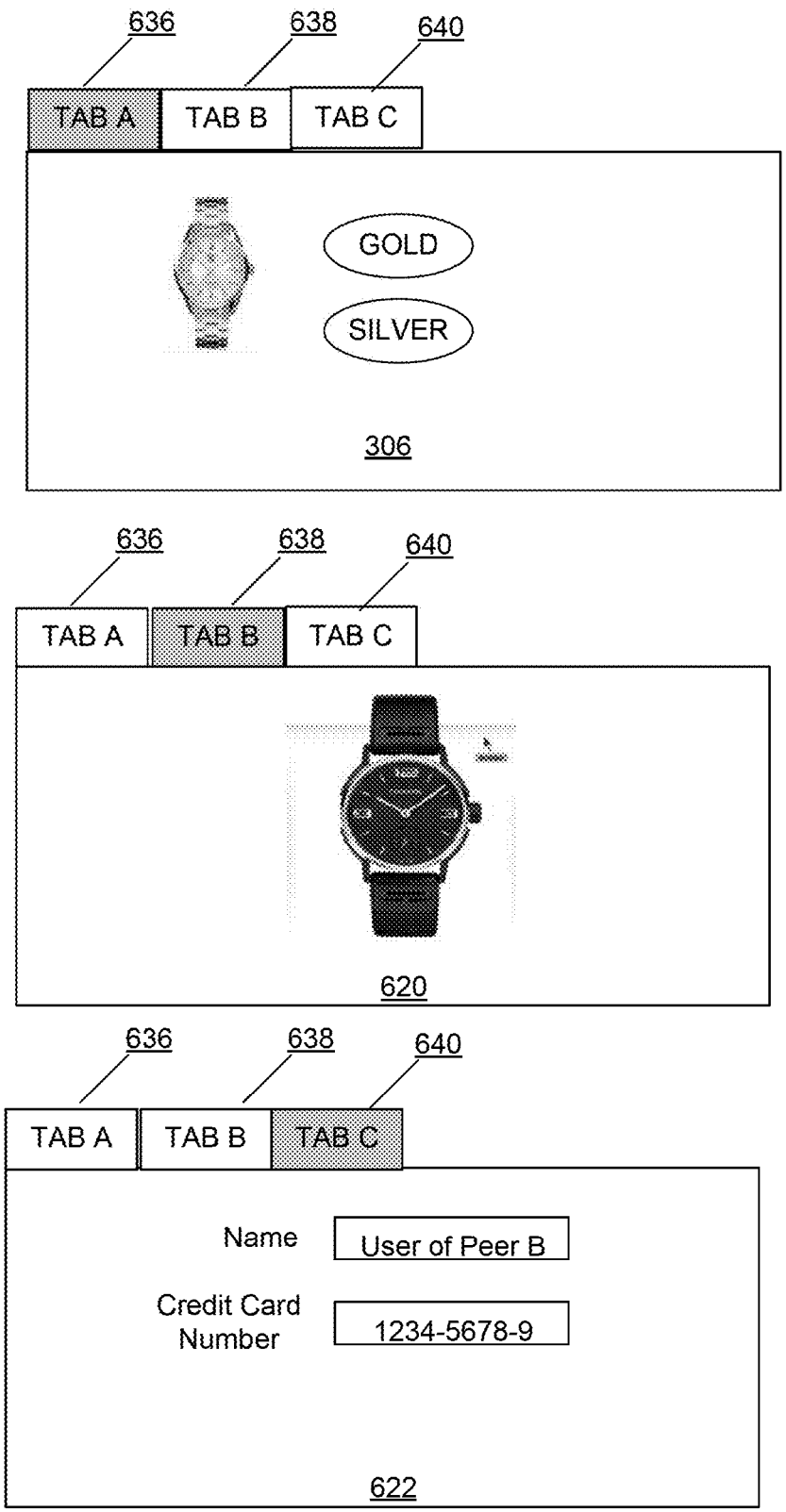
FIG. 6B schematically illustrates the tabs that peer B has opened in one or more web application interfaces.

The co-browsing server 102 may be configured to create a room for each peer 116, 120 and a tab 632, 634, 636, 638, 640 for each tab 128 that a peer 116, 120 is browsing. For example, the tabs 632, 634, 636, 638, 640 in FIG. 5 correspond to the tabs 632, 634, 636, 638, 640 in FIGS. 6A and 6B. FIG. 6A schematically illustrates the tabs 632, 634 that peer A 116 has opened in one or more web application interfaces 104. FIG. 6B schematically illustrates the tabs 636, 638, 640 that peer B 120 has opened in one or more web application interfaces 104. Peer A 116 may be currently browsing tab A 632. Peer B 120 may be currently browsing tab B 638. In some embodiments, the co-browsing web server 102 only keeps track of tabs that are being browsed from the custom website 150 or web application 156.

The co-browsing server 102 may be configured to create a room 510, 550 for a peer 116, 120 when a peer 116, 120 opens a tab 128 of custom webserver 150, and the co-browsing server 102 may be configured to create a tab 632, 634, 636, 638, 640 in the associated room 510, 550 for the tab 128 of the custom webserver 150. The co-browsing server 102 may be configured to create a tab 632, 634, 636, 638, 640 for each tab 128 of the web application 156 that the peer 116, 120 opens. The peer 116, 120 may use different web application interfaces 104.

The co-browsing server 102 may be configured to store each of the initial webpage data 452, the webpage data updates 122, the current webpage data 514, and the UI events 124. In some embodiments, the co-browsing server 102 may be configured to store all the webpage data updates 122 and UI events 124. In some embodiments, the co-browsing server 102 may be configured to store only recent webpage data updates 122 and UI events 124.

For example, peer A 116 may open tab 632 (FIG. 6A) which may be a webpage 304 (FIG. 3) or tab 128 of the custom webserver 150. Peer A 116 or the custom webserver 150 may send an indication to co-browsing server 102 that peer A 116 opened tab 632. In response, co-browsing server 102 may create peer A room 510 and tab A 632. Additionally, the co-browsing server 102 may store initial webpage data 452 which indicates the state of the tab 632 when first opened by peer A 116. The co-browsing server 102 may also store a current webpage data 514 which indicates the current state of the tab 632. The co-browsing server 102 may also store webpage data update 122 which indicate changes that are made to the tab 632. In some embodiments, every change that is made to the tab 632 is stored in the webpage data update 122 so that an operator of the web application 156 can view the browsing history of peer A 116 for tab 632.

Peer A 116 may then open tab B 634 for webpage 618. Peer A 116 or the custom webserver 150 may send an indication to co-browsing server 102 that the peer A 116 opened tab 634. In response the co-browsing server 102 may create tab B 634 in peer A room 510 with initial webpage data 122, webpage data update 122, and current webpage data 514. In a similar fashion, co-browsing server 102 may create peer B room 550, and tab A 636, tab B 638, and tab C 640.

The co-browsing server 102 may be configured to maintain a current tab 128 for each of the peers 116, 120. The co-browsing server 102 may determine a current tab for each of the peers 116, 120 based on receiving the webpage data update 122, initial webpage data 122 and current webpage data 514. The co-browsing server 102 may determine that the current tab for a peer 116, 120 is the tab 128 that last received initial webpage data 452, webpage data update 122, or current webpage data 514.

The store and replay 575 may be configured to store all or some of the webpage data updates 122 and UI events 124 and to replay the webpage data updates 122 and UI events 124. For example, an operator may request that a co-browsing web session between a visitor and operator be replayed or a web session of a visitor be replayed. The store and replay 575 may send the webpage data updates 122 and UI events 124 to the operator in so that the operator may view the co-browsing or web session. In some embodiments, the store and replay 575 may be configured to send the webpage data updates 122 and UI events 124 to the operator or visitor so that the operator or visitor can pause or speed the playing of the replaying of the web session or co-browsing session. In some embodiments, the store and replay 575 may only store and send to the visitor or operator the webpage data updates 122.

Figure 7A:
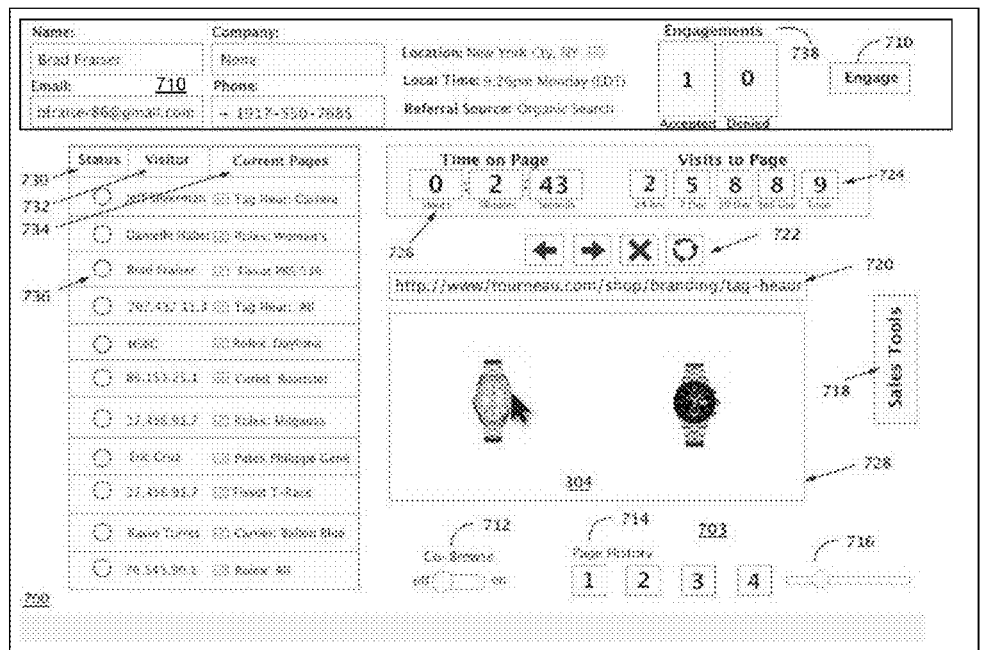
FIGS. 7A, 7B, and 7C schematically illustrate a system for multi-tab co-browsing according to some disclosed embodiments.
Figure 7B:
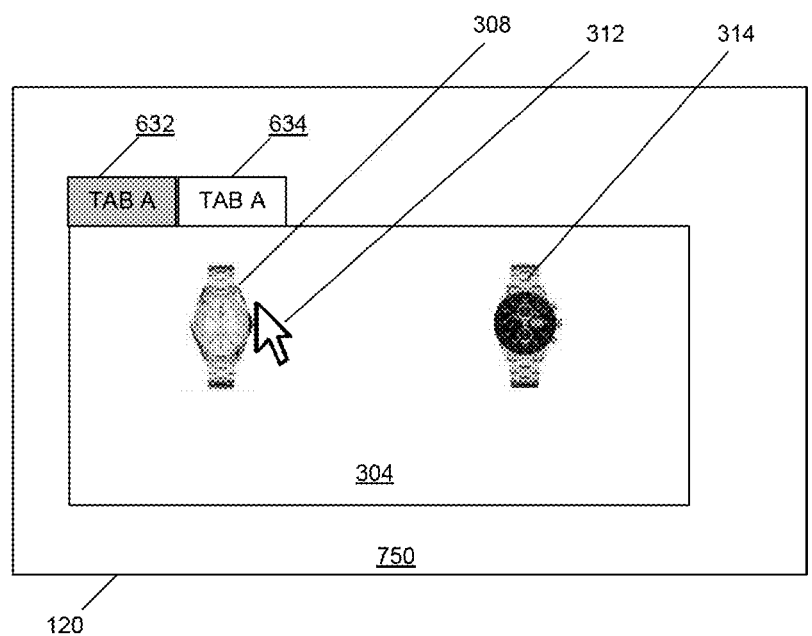
Figure 7C:
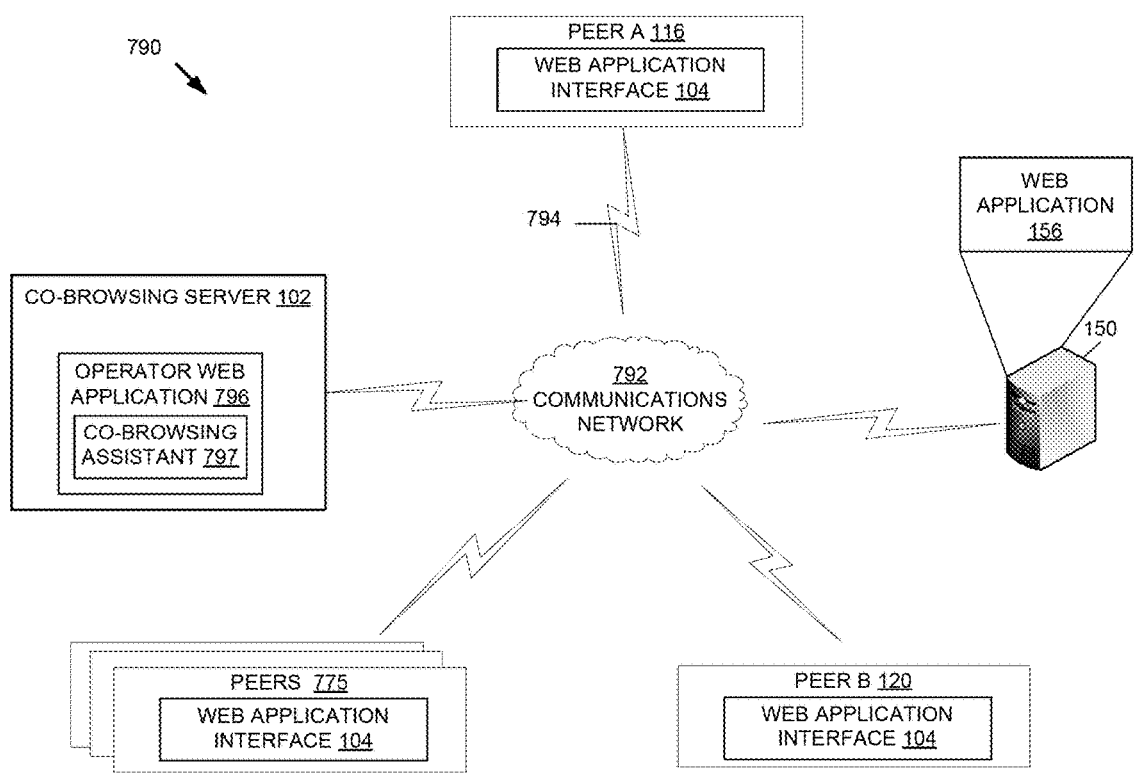

FIGS. 7A, 7B, and 7C schematically illustrate a system for co-browsing according to some disclosed embodiments. FIGS. 7A, 7B, and 7C are discussed together. Illustrated in FIG. 7A is a tab 700 of peer A 116. Illustrated in FIG. 7B is a tab 304 of peer B 120. Illustrated in FIG. 7C is co-browsing server 102, peer A 116, peer B 120, custom webserver 150, peers 775, and communications network 792.

The communications network 792 may be one or more networks including the Internet, wireless local area networks, private networks, etc. Co-browsing server 102, peer A 116, peer B 120, custom webserver 150, and peers 775 are in communicate via the communication network 792. In some embodiments, one or more of co-browsing server 102, peer A 116, peer B 120, custom webserver 150, and peers 775 may be in direct communication with one another.

FIG. 7B illustrates peer B 120 displaying tab A 632 of web application 156. The peers 775 are accessing the web application 156, but the tabs of the peers 775 are not displayed.

FIG. 7A illustrates peer A 116 displaying a tab of a web application interface 104 such Internet Explorer®. The web application interface 104 is accessing the operator web application 796. The operator web application 796 may be hosted by the co-browsing server 102, or, in some embodiments, the operator web application 796 may be hosted by another server (not illustrated). The operator web application 796 may include a co-browsing assistant 797 that may be configured to assist visitors to co-browse. For example, the co-browsing assistant 797 may generate UI events to take a visitor through a series of webpages to highlight the features of a product.

Illustrated in FIG. 7A are a visitor list 701, selected visitor information 710, a webpage control area 703, and a sales tools button 718. The visitor list 701 is a list of the visitors to the web application 156. The visitor list 701 may include information regarding the visitors. Each of the visitors may be one of the peers 775 illustrated in FIG. 7C. The information regarding the visitors may include status 730, visitor 732, and current page 734. The status 739 may indicate a current status 736. The current status 736 may indicate by a color whether the visitor is active (green), idle for a short period of time (yellow), or idle for a long period of time. In some embodiments, the status 730 may indicate whether the visitor is available for co-browsing or a likely candidate for co-browsing based on profiling the visitor for likelihood of making a purchase. In some embodiments, the status 730 may indicate whether or not the visitor is co-browsing with another operator. In some embodiments, selecting engagements 738 will provide a list of the operators that have engaged the visitor. A visitor may be a selected visitor 736. In some embodiments, additional information may be provided regarding the visitors. For example, a number of tabs that are currently opened for the web application 156 may be included for each of the visitors.

Information 710 of the selected visitor 736 may be provided by the operator web application 796. For example, the information 710 may include name, email, company, phone, location, referral source, and engagements 738. The selected visitor's name is Brad Fraiser. The engagements 738 may be a number of accepted co-browsing engagements, illustrated as "1", and a number of rejected co-browsing engagements, illustrated as "0" or other engagement result.

The webpage control area 703 may include a time on page 726, a visits to page 724, webpage controls 722, the webpage address 720 of the co-browsed webpage 728, a co-browse button 712, a page history 714, and a page history slider 716.

The time on the page 726 may indicate the number of hours, minutes, and seconds the selected visitor 736 has been on the co-browsed webpage 728. The visits to page 724 may indicate the number of times the selected visitor 736 has visited the co-browsed page 728. For example, the visits to page 724 may indicate a number of times in the last 24 hour, illustrated as "2", a number of times visited in the last 7 days, illustrated as "5", a number of times in the last 30 days, illustrated as "8", a number of times visited in the last 365 days, illustrated as "8", and a number of times visited overall, illustrated as "9."

The webpage controls 722 may control the co-browsed webpage 728 when co-browsing is turned on. The left arrow may go back a page in the browsing history, the right arrow may go forward a page in the browsing history, "X" may stop the loading of a webpage, and the circular arrows may reload the webpage. The co-browsed webpage 728 may be the same webpage 304 as peer B is viewing (see FIG. 7B). The co-browse button 712 may turn co-browsing on and off. In the on mode, events taken by peer A 116 will be mirrored in peer 120. In the off mode, peer A 116 observes peer B 120, also the selected visitor 736 browse the webpage application 156.

The page history 714 displays where the co-browsed webpage 728 fits into the page history 714. And peer A 116 may select a different page in the page history 714 and during co-browsing the selected page in the page history 714 will be displayed as the co-browsed webpage 728. The page history slider 716 may be used to access different pages in the page history 714.

The sales tools 718 may be a button to access sales tools for peer A 116 to use to try and sell a product or service to the selected visitor 736.

Figure 8:
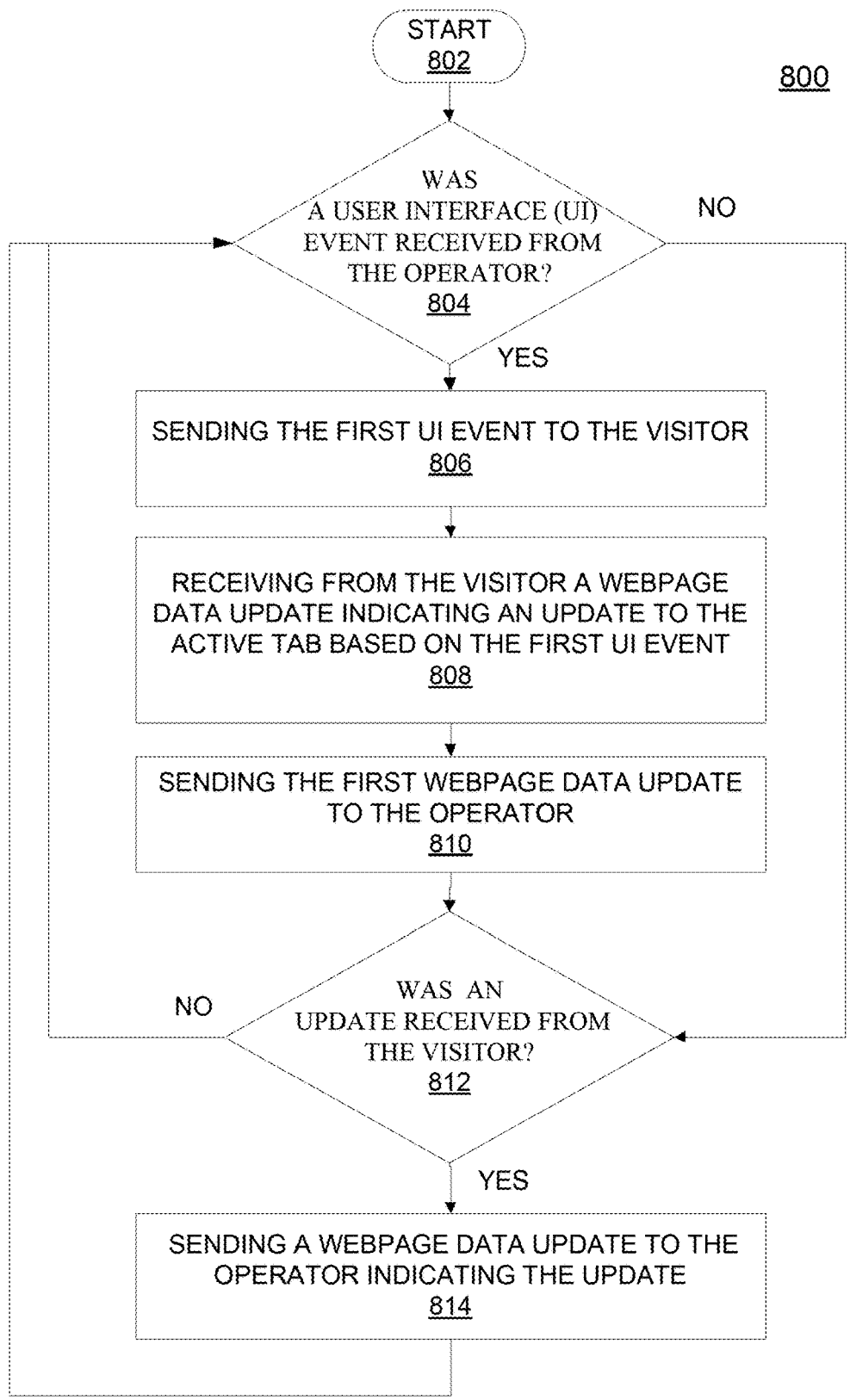
FIG. 8 schematically illustrates a method for multi-tab co-browsing according to some disclosed embodiments.

FIG. 8 schematically illustrates a method for multi-tab co-browsing according to some disclosed embodiments. The method 800 will be discussed in conjunction with FIGS. 1, 7A, 7B, and 7C. The method 800 may begin at 802 with start.

The method 800 may continue at 804 with was a user interface (UI) event received from the operator. For example, peer A 116 (FIG. 7A) may be co-browsing with peer B 120, so the co-browse button 712 would have to be switched to on. Prior to the co-browse button 712 being switched to on the operator, peer A 116, may be observing the visitor, peer B 120. The operator of peer A 116 may click the cursor 312 over the watch 308. Peer A 116 may then generate a UI events 124 that indicates the click of the cursor 312 over the watch 308. The peer A 116 may then send the UI events 124 to the co-browsing server 102.

The method 800 may continue at 806 with sending the first UI event to the visitor. For example, the co-browsing server 102 may send the UI events 124 to peer B 120. Peer B 120 may receive the UI events 124 and update the webpage data 118 (see FIG. 1) based on the UI events 124. Peer B 120 may then determine the difference between the webpage data 118 before the event in UI events 124 and after the event in UI events 124 and generate a webpage data update 122 and send the webpage update 122 to the co-browsing server 102. Note that after the click of the cursor 310 over the watch 308, the tab A would become webpage 306 (FIG. 3C).

The method 800 may continue at 808 with receiving from the visitor a webpage data update indication an update to the active tab based on the first UI event. Continuing with the example above, the webpage update 122 sent to the co-browsing server 102 indicates the update to tab A 632.

The method 800 continues at 810 with sending the first webpage data update to the operator. Continuing with the example above, the co-browsing server 102 may send the webpage update 122 to peer A 116. Peer A 116 may receive the update and update the webpage data 118 based on the webpage update 122.

The method 800 may continue at 812 with was an update received of the active tab from the visitor. If there was no update received, then method 800 may return to 804. If there was an update received of the active tab from the visitor, then the method 800 may continue at 814 with sending a webpage data update to the operator indicating the update to the active tab. Continuing with the example, the visitor at peer B 120 may now be webpage 306 and the visitor may click gold (FIG. 3C). Peer B 120 may then generate a webpage update 122 to reflect the changes in the webpage 306 after the visitor clicks gold. Peer B 120 may then generate a webpage update 122 to indicate the difference to webpage 306 after the visitor clicks gold. Peer B 120 may then send the webpage data update 122 to the co-browsing server 102. The co-browsing server 102 may adapt the webpage update 122 for peer A 116 and then send the webpage update 122 to peer A 116.

In some embodiments, an indication of the tab the webpage data update 122 regards may be sent to the operator. For example, if the visitor switches tabs, an indication of the switch may be sent to the operator. Additionally, in some embodiments, if the visitor switches tabs, webpage data may be sent to the operator for the new tab. The method 800 may end.

In some embodiments, the method 800 may include the co-browsing server 102 sending a tab to the operator. For example, the co-browsing server 102 (see FIGS. 1 and 7C) may send data to peer A 116 (FIG. 7C) of the active tab. In the example of FIGS. 7A, 7B, and 7C the active tab is tab A 632 with webpage 304 of peer B 120 (see FIG. 7B).

Figure 9:
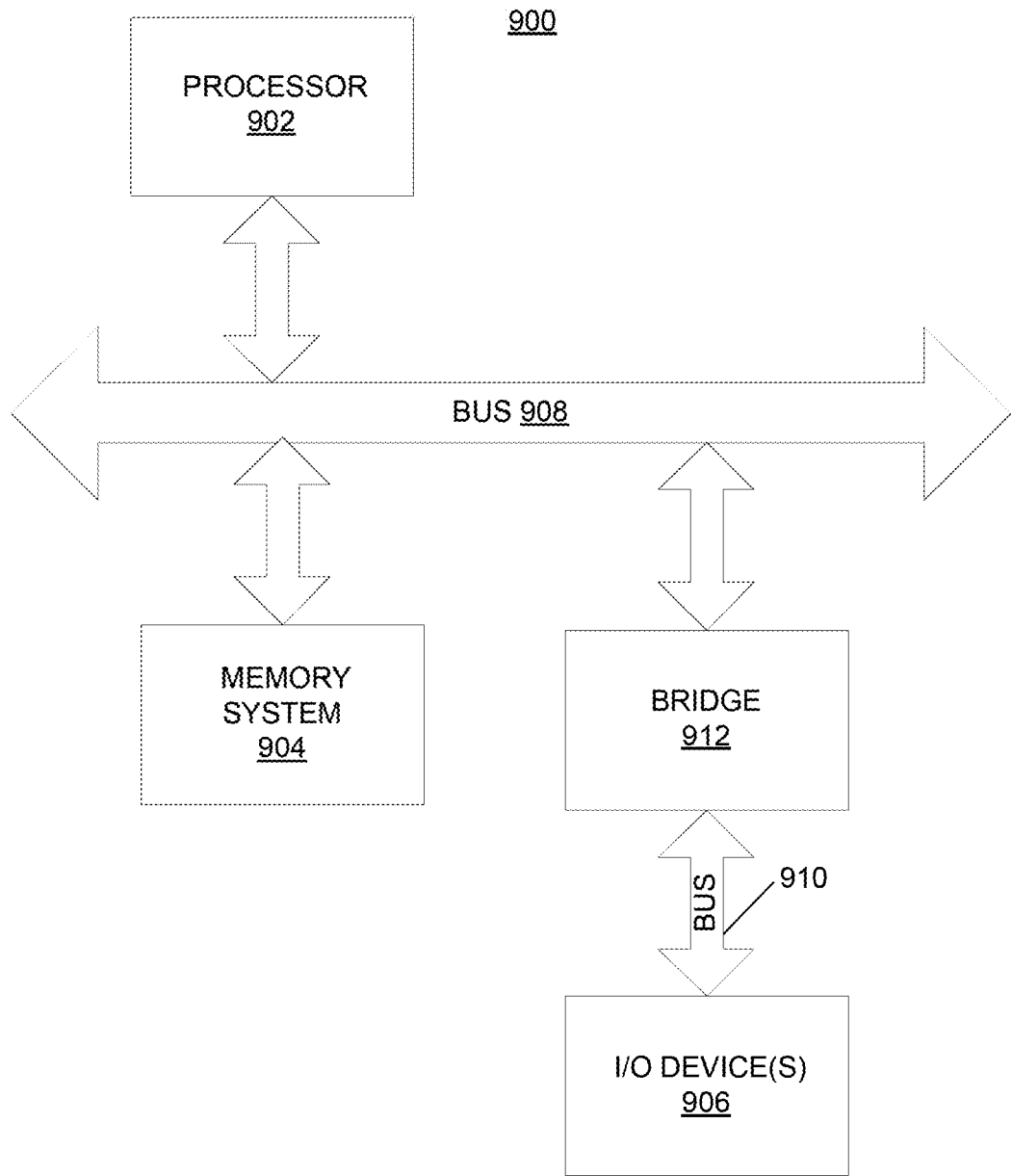
FIG. 9 is a simplified functional block diagram of a computer system.

FIG. 9 is a simplified functional block diagram of a computer system 900. The co-browsing server 102, and the peers 116, 120 may be implemented by the computer system 900 where portion of the co-browsing server 102 and peers 116, 120 may be implemented in software, hardware, or firmware. In some embodiments, the functions of the co-browser 102 and peers 116, 120 may be distributed across multiple computer systems 900.

As illustrated in FIG. 9, the computer system 900 includes one or more processors 902, one or more memory systems 904 and one or more input/output (I/O) devices 906 in communication by two communication buses 906, 908, and a bridge 912. The communication buses 906, 908 and bridge 912 may be implemented in a variety of ways and may include one or more computer buses 908, 910 and/or bridge devices 912 as shown in FIG. 9. The I/O devices 906 can include network adapters and/or mass storage devices from which the computer system 900 can receive data from the co-browsing server 102, or the peers 116, 120 for processing by the processor 902 when the computer system 800 operates as a co-browsing server 102 or peer 116, 120.

Figure 10:
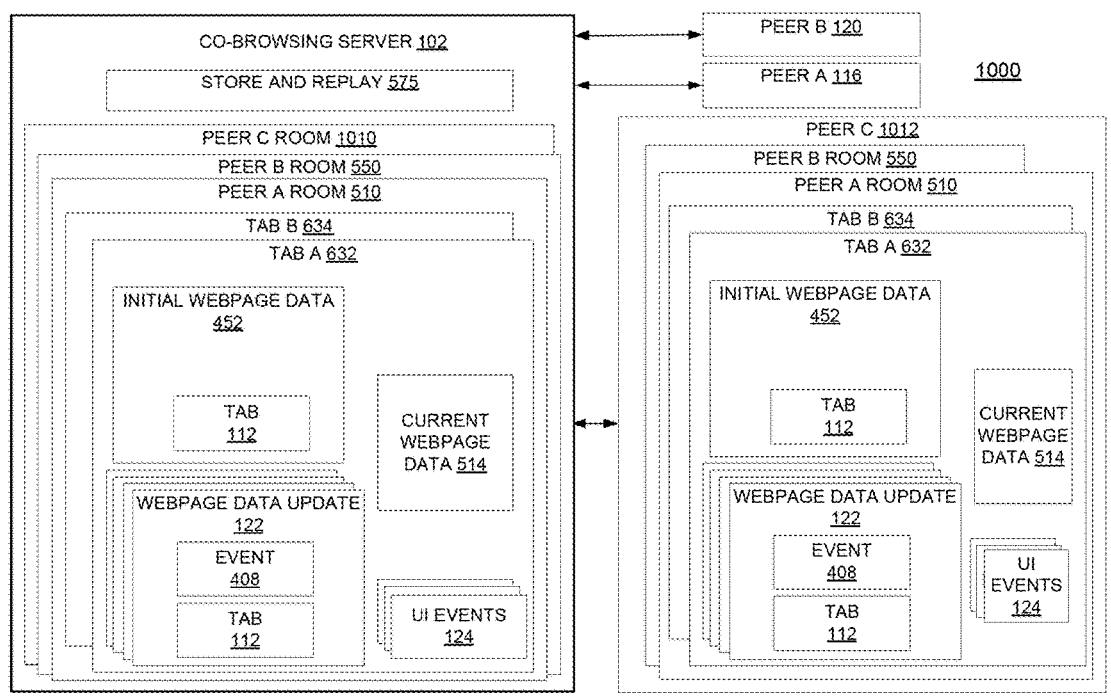
FIG. 10 schematically illustrates a system for co-browsing 1 according to some disclosed embodiments.

FIG. 10 schematically illustrates a system for co-browsing 1000 according to some disclosed embodiments. FIG. 10 illustrates a co-browsing server 102, peer A 116, peer B 120, and peer C 1012. The custom website 150 is not illustrated but may be in communication with each of co-browsing server 102, peer A 116, peer B 120, and peer C 1012. As illustrated, peer C 1012 includes information regarding peer A 116 and peer B 120.

Peer A 116, and peer B 120 may be visitors to the web application 156. Peer C 1012 may be an operator. The co-browsing server 102 may be configured to send webpage data updates 122, initial webpage data 452, current webpage data 514, and/or UI events 124 regarding peer A 116 and peer B 120 for each opened tab 632, 634 to peer C 1012. Co-browsing server 102 may keep track of which peers 116, 120, 1012 are active on the web application 156. The co-browsing server 102 may keep track of which peers 116, 120 that peer C 1012 is observing or co-browsing with. The co-browsing server 102 may send one or more of webpage data updates 122, initial webpage data 452, current webpage data 514, and UI events 124 to peer C based on peer C being an operator of web application 156 and peer A 116 and peer B 120 being visitors to web application 156.

For example, co-browsing server 102 may send the current webpage data 514 to peer C 1012 each time that peer A 116 makes a change to a tab 632, 634, or switches to a new tab. In this way, peer C 1012 may have the current webpage data 514 for each opened tab 632, 634 of peer A 116. Then if peer C 1012 selects to observe or co-browse with peer A 116, then current webpage data 514 of the active tab of peer A 116 can be displayed to peer C 1012 without it having to be sent from co-browsing server 102. In some embodiments, the co-browsing server 102 may send the webpage data updates 122 received from the visitor peers 116, 120. In some embodiments, the co-browsing server 102 may adapt the webpage data updates 122 prior to sending them to peer C 1012.

In some embodiments, the co-browsing server 102 will send webpage data updates 122, initial webpage data 452, current webpage data 514, and/or UI events 124 regarding tabs 632, 634 for peers 116, 120 to peer C 1012 for an active tab of the visitor peers 116, 120. And, when a visitor peer 116, 120 switches tabs 632, 634, the co-browsing server 102 may be configured to send webpage data updates 122, initial webpage data 452, current webpage data 514, and/or UI events 124 regarding the new tab 632, 634 to the operator peer 1012.

In some embodiments, when an operator peer C 1012 becomes active with the operator web application 796, the co-browsing server 102 will send webpage data updates 122, initial webpage data 452, current webpage data 514, and/or UI events 124 regarding an active tab for one or more of the visitor peers 116, 120.

In some embodiments, the system 1000 has the advantage that by sending information relating to the tabs 632, 634 before they need to be displayed by a peer 116, 120, 1012 that the peer 116, 120, 1012 may not need to wait for the tab 632, 634 to be displayed.

Figure 11:
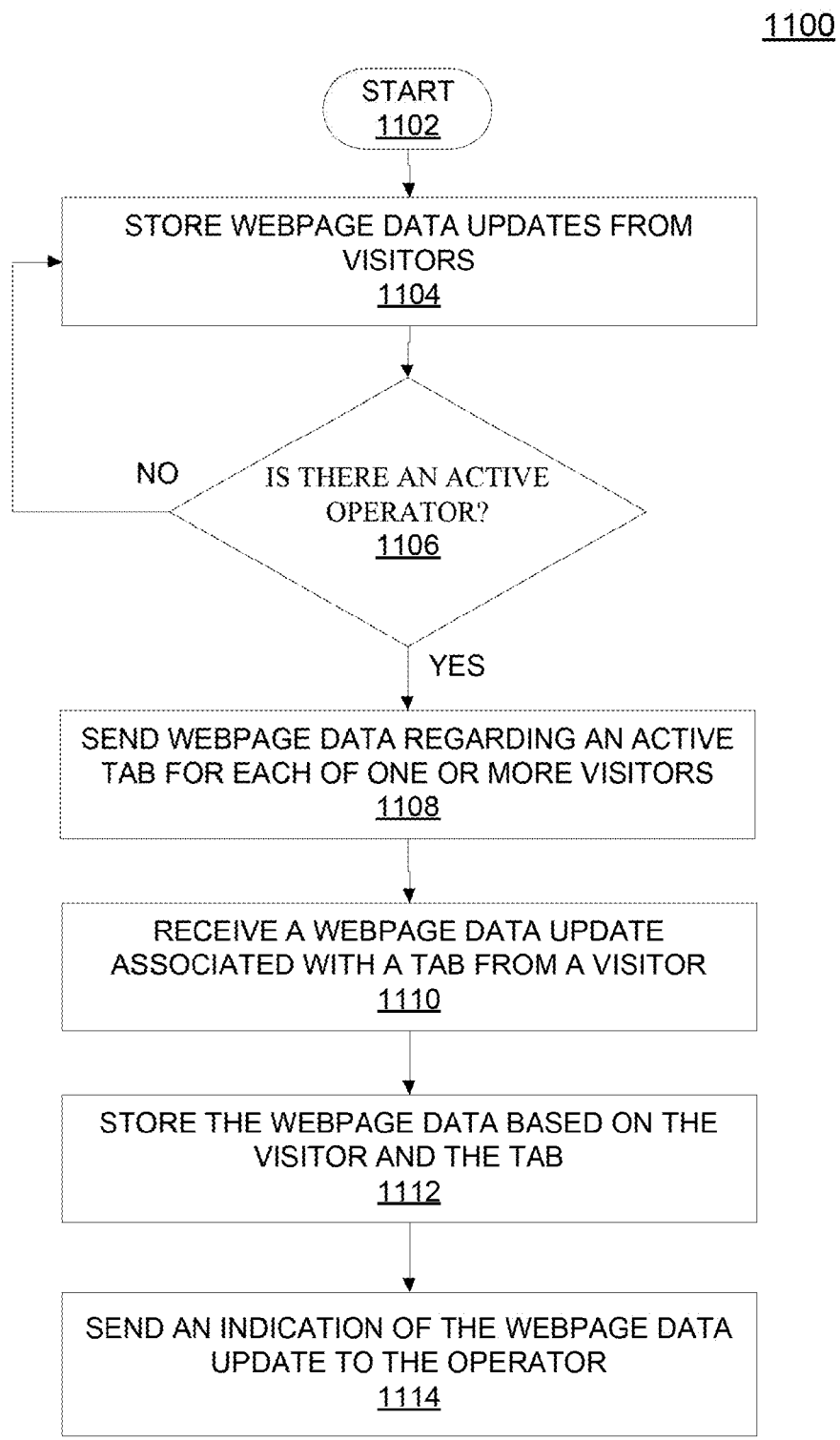
FIG. 11 schematically illustrates a method of co-browsing according to some disclosed embodiments.

FIG. 11 schematically illustrates a method of co-browsing according to some disclosed embodiments. The method 1100 will be explained in conjunction with FIGS. 1, 7, and 10. The method 1100 may begin at 1102 with start. The method 1110 may continue at 1104 with storing webpage data updates from visitors. For example, the visitor peers 116, 120 may be active with web application 150. The co-browsing server 102 may store web page data updates 122 associated with rooms 510, 550, 1010.

The method 1100 may continue at 1106 with determining whether there is an active operator. For example, the co-browsing server 102 may determine whether or not there is an active operator associated with the operator web application 796. If there is not an active operator, the method 1100 may return to 1104 with store webpage data updates from visitors.

The method 1100 may continue at 1108 with sending webpage data regarding an active tab for each of the one or more visitors. For example, the co-browsing server 102 may send current webpage data 514 for the active tab for visitor peers A, B 116, 120 to the operator peer C 1012. In some embodiments, the co-browsing server 102 may select some of the visitor peers A, B 116, 120 to send the current webpage data 514 to the operator 1012. For example, the co-browsing server 102 may select the visitor peers A, B 116, 120 based on one or more filtering criteria such as geographic location, likelihood of sales to operator peer C 1012, or a sales group of operator peer C 1012.

The method 1100 may continue at 1110 with receiving a webpage data update associated with a tab from a visitor. For example, peer A 116 may send a webpage data update 122 to the co-browsing server 102.

The method 1100 may continue at 1112 with storing the webpage data based on the visitor and the tab. For example, co-browsing server 102 may store the webpage data update 122 in a room 510 for peer A 116 and associated with a tab A 632 that is associated with the webpage data update 122.

The method 1100 may continue at 1114 with sending an indication of the webpage data update to the operator 1114. For example, continuing with the example above, the co-browsing server 102 may send the webpage data update 122 received from visitor peer A 116 to operator C 1012. In some embodiments, the co-browsing server 102 may send the current webpage data 514 instead of, or in addition to the webpage data update 122. In some embodiments, the webpage data update 122 may regard a different tab 112. The co-browsing server 122 may then send other information from the different tab 112 so that the operator 1012 will have enough information to have the current webpage data 514. For example, the co-browsing server 122 may send other webpage data updates 122 that operator peer C 1012 has not yet received from the different tab 112, or the co-browsing server 102 may send the current webpage data 514. The method 1100 may return to 1110. The method 1100 may have the advantage that information is stored for tabs 112 of visitor peers 116, 120 so that the operator peer 1012 may have the tab 112 displayed of a visitor peer 116, 120 without receiving additional information from the co-browsing server 102.

Figure 12:
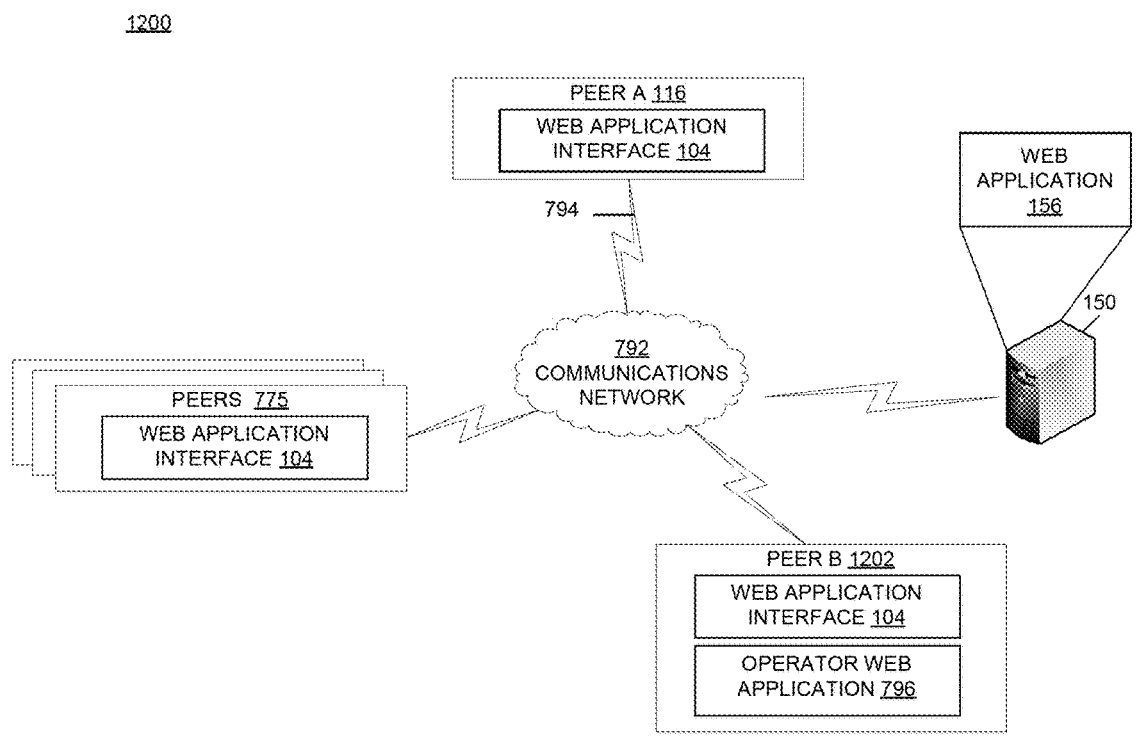
FIG. 12 illustrates a system for co-browsing according to some disclosed embodiments in which peer to peer communication is used.

FIG. 12 illustrates a system for co-browsing according to some disclosed embodiments in which peer to peer communication is used. Illustrated in FIG. 12 is peer A 116, peer B 1202, custom webserver 150, peers 775, and communications network 792. Peer A 116 and peers 775 may be a visitors to web application 156. Peer B 1202 may be an operator of web application 156. Peer B 1202 includes operator web application 796. Peer A 116 and peers 775 may communicate with peer B 1202 directly. Peer A 116 and peers 775 may communicate with peer B 1202 without the co-browsing server 102.

Figure 13:
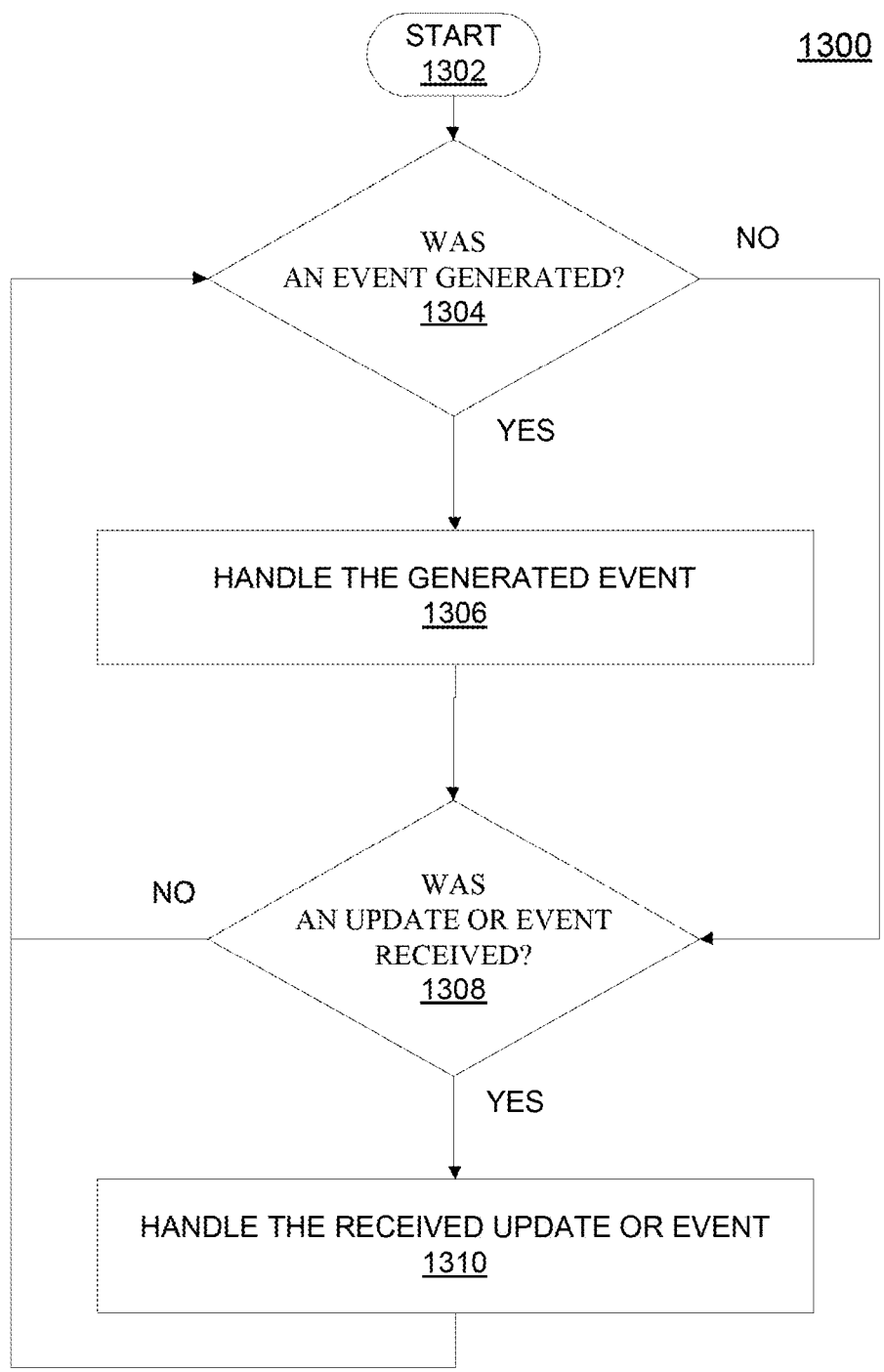
FIG. 13 illustrates a method of co-browsing according to some disclosed embodiments.

FIG. 13 illustrates a method of co-browsing according to some disclosed embodiments. The method 1300 will be disclosed in conjunction with FIG. 12. The method 1300 may begin at 1302 with start. The method 1300 may continue at 1304 with was determining whether an event was generated. For example, referring to FIG. 12, peer A 116 may be a visitor of web application 156. A user of peer A 116 may click on an item in the web application interface 104 of peer A 116. Peer A 116 may update the tab based on the event to generate an updated tab. Peer A 116 may then generate a webpage data update 122 indicating the difference between the tab and the updated tab. Peer A 116 may then send the webpage data update 122 to an operator, which may be peer B 120 (FIG. 12).

An alternative example, a user of peer B 1202 may click on an item in the web application interface 104 of peer B 1202. Peer B 1202 may send the click as a UI event 124 to peer A 116. Peer A 116 may then update the tab associated with the event based on the event in the UI event 124. Peer A 116 may then generate a webpage data update 122 indicating the difference between the tab and the updated tab. Peer A 116 may then send the webpage data update 122 to an operator, which may be peer B 1202. Peer B 1202 may then update the tab based on the received webpage data update 122 from peer A 116.

In another alternative example, a user of peer B 1202 may click on an item in the web application interface 104 of peer B 1202. Peer B 1202 may update the tab based on the event to generate an updated tab. Peer B 1202 may then generate a webpage data update 122 indicating the difference between the tab and the updated tab. Peer B 1202 may then send the webpage data update 122 to a visitor, which may be peer A 116. If an event was not generated at 1304, then the method 1300 continues at 1308.

The method 1300 may continue at 1308 with determining whether an update or event was received. For example, peer A 116 may receive a UI events 124 or webpage data update 122 from peer B 1202. Alternatively, or in addition, peer B 1202 may receive a webpage update 122 or UI events 124 from peer A 16. If an update or event was not received the method 1300 may return to 1304.

The method 1300 may continue at 1310 with handling the received update or event. For example, peer A 116, which is a visitor, may receive an UI event 124 from peer B 1202, which is an operator. Peer A 116 may then update the tab associated with the UI event 124 based on the event in the UI event 124. Peer A 116 may then generate a webpage data update 122 indicating the difference between the tab and the updated tab. Peer A 116 may then send the webpage data update 122 to an operator, which may be peer B 1202. Peer B 1202 may then update the tab based on the received webpage data update 122 from peer A 116.

Alternatively, peer A 116, which is a visitor, may receive a webpage data update 122 from peer B 1202, which is an operator. Peer A 116 may then update the tab associated with the webpage data update 122.

In another example, peer B 1202, which is an operator, may receive a webpage data update 122 from peer A 116, which is a visitor. Peer B 1202 may then update the tab associated with webpage data update 122.

In another example, peer B 1202, which is an operator, may receive a UI event 124 from peer A 116, which is a visitor. Peer B 1202 may update the tab based on the event in the UI event 124. Peer B 1202 may then generate a webpage data update 122 indicating the difference between the tab and the updated tab. Peer B 1202 may then send the webpage data update 122 to peer A 116. Peer A 116 may then update the tab based on the received webpage data update 122 from peer B 1202.

The method 1300 may return to 1304. The method 1300 may end when the operator, for example peer B 1202, stops observing or co-browsing with the visitor, for example peer A 116. Alternatively, the method 1300 may end when the visitor, for example peer A 116 stop browsing a custom website.

Figure 14:
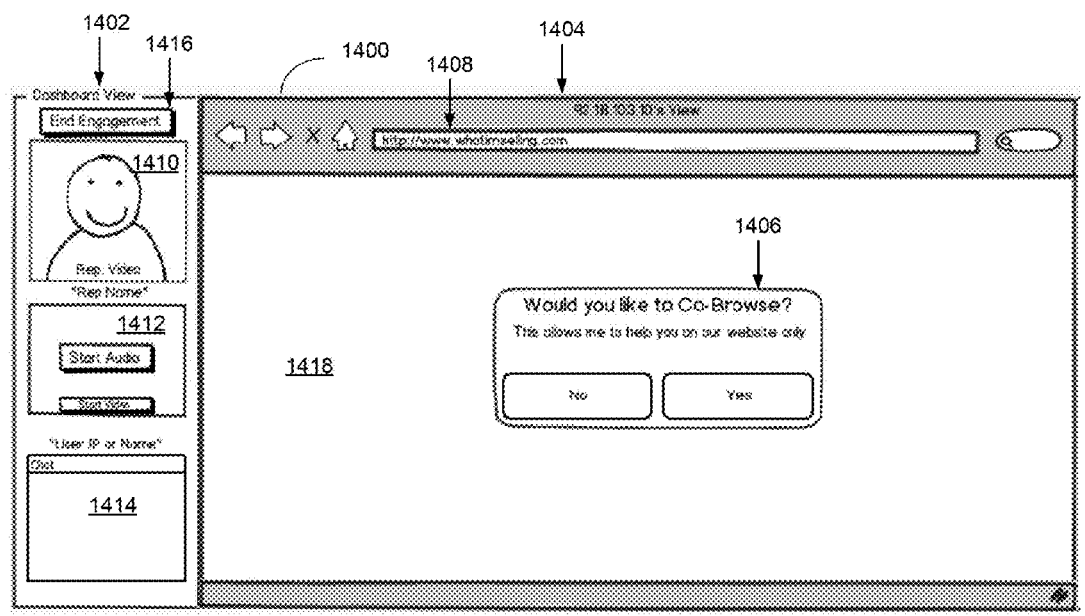
FIG. 14 illustrates a system for co-browsing according to some disclosed embodiments.

FIG. 14 illustrates a system for co-browsing according to some disclosed embodiments. Illustrated in FIG. 14 is a user interface screen 1400 that may be presented to a visitor to the web application 156. In some embodiments, the operator web application 796 may have generated the user interface screen 1400. The user interface screen 1400 may have been arrived at by an operator selecting engage 710 (FIG. 7A).

Illustrated in FIG. 14 are two main areas a communication area 1402, and the current web interface application 1404 of the visitor, for example peer B 120. As illustrated, the visitor is being requested to co-browse with the operator, for example peer A 116, in a dialogue box 1306. The tab 1418 may be tab 632 such as illustrated in FIG. 7B. The current web interface application 1404 may include the universal resource locator 1408. The communication area 1402 may include a rep video 1410, which may be a video of the operator on peer A 116. An area 1412 for video or starting audio of the visitor. And, an area 1414 for typing and receiving text. The user interface screen 1400 enables the operator, peer A 116, and visitor, peer B 120, to co-browse the web application 156 while sharing one or more of video, audio, or text of one another.

In some embodiments, the user interface screen 1400 is generated by an operator or a visitor initiating a co-browsing session and transferring the current webpage data 514 into a frame that allows the communication area 1402 to fit the tab 112. The webpage data 514 may also be adjusted within the tab 112 in order to accommodate the communication area 1402. In some embodiments, when the co-browsing session is terminated, the current webpage data 514 is transferred back to tab 112 without the communication area 1402.

Figure 15:
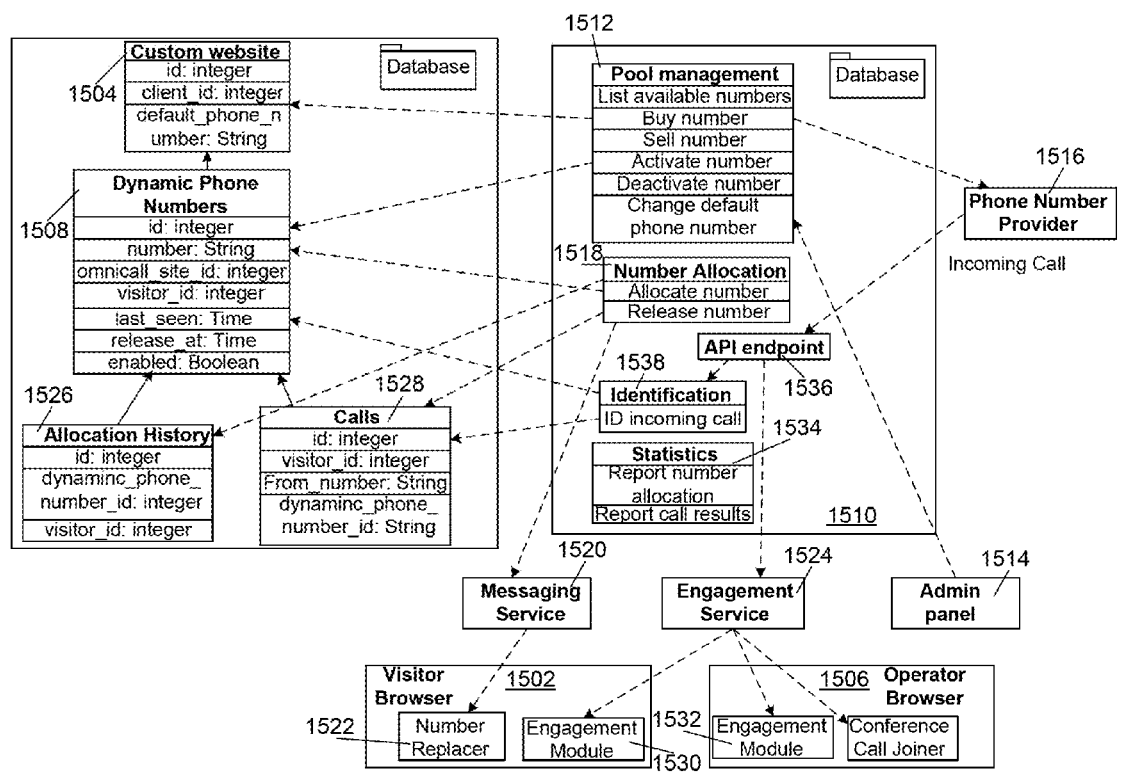
FIG. 15 schematically illustrates a method of assigning a dynamic phone number to a visitor of a custom website and directly engaging the visitor using the dynamic phone number.
Figure 16:
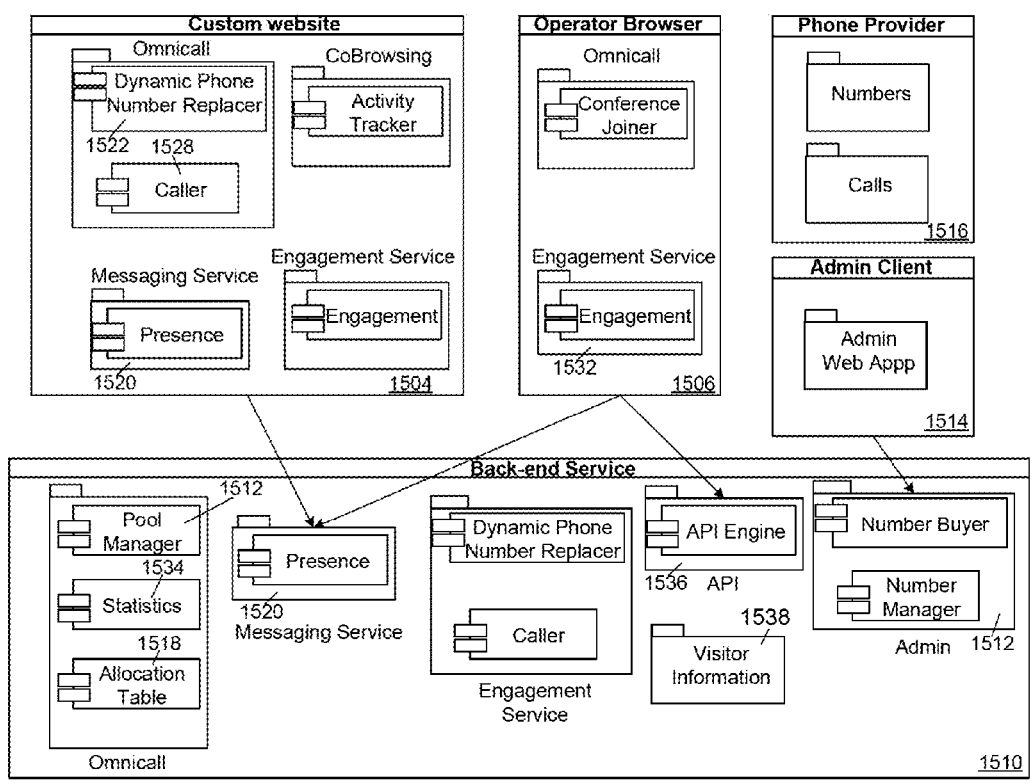
FIG. 16 schematically illustrates a system for assigning a dynamic phone number to a visitor of a custom website and directly engaging the visitor using dynamic phone number.

FIG. 15 and FIG. 16 are schematic illustrations of a method and system of provisioning and managing one or more dynamic phone numbers 1508, allocating the one or more dynamic phone numbers 1508 to a visitor 1502 of the custom website 1504 or application, and connecting the user to an operator 1506 in a call center. In an embodiment, the dynamic number 1508 may be assigned to a visitor 1502 upon the visitor 1502 landing on the custom website 1504. When the visitor 1502 calls the dynamic number 1508, the operator 1506 may be able to view the visitor's browser 1502 and/or co-browse with the visitor 1502, as described above. In another embodiment, the dynamic number 1508 may be allocated after the visitor 1502 electronically authenticates his or her identification through the visitor's 1502 internet-enabled device using any one of the conventional methods described above. When the visitor 1502 calls the dynamic number 1508, the visitor 1502 may be directly connected to the operator 1506 without additional authentication. The one or more dynamic phone numbers 1508 may be allocated to be displayed on, or replace a default phone number of, the custom website. The allocation of the dynamic number 1508 may be described in more detail below.

The custom website 1504 may be a website accessible by a browser or a mobile browser, or an application, such as a native mobile application, and/or a desktop application that is running on, or through, a webserver accessible over the Internet. The application may provide a user-friendly user interface (UI). The application may be run and deployed as a premise or in a cloud computing environment. The web application may run as a daemon with a load balancer in front to manage the load across different web application workers.

Some examples of the custom website 1504 may include a website of a financial institution, a utility or service provider, a retailer, a medical provider, an insurance provider, or any website that requires a visitor to authenticate his or her identity. In some embodiments, the custom website 1504 may offer goods, services, or information, all of which may be for sale on one or more web pages. The custom website 1504 may have a unique site identification (site ID).

In an embodiment, the custom website 1504 may have a default phone number listed in the application or on at least one of the one or more web pages. The default number may be what is typically provided on a website or application (i.e., a static number shown to every visitor that can be used to call for information or help while browsing a website or application).

In an embodiment, the default phone number may be replaced with a dynamic phone number 1508 unique to each visitor. This may occur, for example, after the visitor logs in to his or her account and/or authenticates his or her identity using any conventional technique. For example, a visitor may authenticate his or her identity using conventional one-factor or two-factor methods for identification verification that may involve entering a password or pattern or using biometrics. In another embodiment, the dynamic phone number 1508 may simply be displayed to the visitor 1502 on the custom webstie 1504. This may be done by, for example, inserting the dynamic number 1508 using a div tag.

To enable this, a back-end service 1510 may be provided to an operator of the custom website 1504 that allows for the management of a dynamic phone number pool 1512. The back-end service 1510 may be run through a host sever.

The back-end service 1510 may have different levels of access, such as for managers or admin. The management may be done by an administrator (admin) of the custom website 1504 using an administration panel (admin panel 1514). The back-end service 1510 may provide the information and making necessary changes. The dynamic phone number pool 1512 for a custom website 1504 may include a list of available dynamic phone numbers 1508.

The back-end service 1510 may allow the admin 1514 to acquire one or more of the available dynamic phone numbers 1508 identified by the back-end service 1510. In an embodiment, the one or more available dynamic phone numbers 1508 may be queried from the back-end service 1510 using one or more filters selected by the admin 1514. Example of filters that may be used may include a desired area code, whether the dynamic number 1508 should be toll-free or not, and/or a pattern which must match the phone number (e.g., must start with 8723). The admin 1514 may choose one or more of the available dynamic numbers 1508 to buy from the list presented.

When the admin 1514 purchases one or more of the available dynamic numbers 1508, the back-end service 1510 may contact a phone number provider 1516 on behalf of the admin 1514 to finalize the purchase. The phone number provider 1516 may be any service that allows for the buying of phone numbers and the routing of phone calls to those numbers. Upon successful purchase from the phone number provider 1516, the one or more available dynamic phone numbers 1508 may be added to the dynamic phone number pool 1512.

The back-end service 1510 may also allow the admin 1514 to sell one or more dynamic phone numbers 1508 from the dynamic phone number pool 1512. To do so, a link may be provided in the dynamic phone number pool 1512 to sell the number. When clicked, the link will prompt the back-end service 1510 to cancel the subscription of the one or more dynamic phone numbers from the phone number provider 1516.

The back-end service 1510 may also allow the admin 1514 to activate or deactivate one or more of the dynamic phone numbers 1508 in the dynamic phone number pool 1510. While deactivated, the dynamic phone numbers 1508 may remain in possession of the custom web site 1504, but they may not be displayed or used to replace the default phone number. It should be noted that the dynamic numbers 1508 may be acquired, released, activated, and deactivated at any time. In an embodiment, these actions may be performed before a visitor 1502 lands on the custom website 1504. In another embedment, these actions may be performed in real-time as the visitor 1502 accesses the custom website 1504.

The dynamic phone number 1508 may be displayed via the back-end service 1510 at any time. In an embodiment, the back-end service 1510 may replace the default phone number with the dynamic phone number 1508 after the visitor lands on the custom website 1504, or performs an activity, such as visits a section of the custom website 1504 or selects a link on the custom website 1504. In another embodiment, the back-end service 1510 may display the dynamic phone number 1508 only after a visitor-initiated event, such as authenticating his or her identity. In an embodiment, the visitor may be accessing a set of one or more browser tabs on the custom website 1504 or portions of the application. The visitor may have only one active tab and associated unique visitor identification (visitor ID).

Using a number allocation function 1518, the back-end service 1510 may decide that a dynamic phone number 1508 should be allocated for a visitor 1502. In an embodiment, a messaging service 1520 may be used to communicate with a front-end module, or number replacer 1522, to replace the default phone number with the allocated dynamic phone number 1508. The messaging service 1520 may allow for the sending of messages to a browser tab or application based on the visitor ID. The front-end module, or number replacer 1522, may be in the visitor browser 1502 or application and may take care of seamlessly replacing the default phone number with the allocated dynamic phone number 1508.

The default phone number may be replaced with the dynamic phone number 1508 while preserving the formatting of the default phone number. In an embodiment in which the default phone number has a country code, the dynamic phone number 1508 may retain its country code as well. In an embodiment in which the default phone number does not have a country code, a country code may be removed from the dynamic phone number 1508. In an embodiment in which the default phone number has formatting, such as spaces, dashes, and/or parentheses, the dynamic phone number 1508 will preserve the formatting.

An engagement service 1524 may be used to capture visitor 1502 behavior on the custom website 1504. The engagement service 1524 may track when a when a visitor 1502 lands on a page, leaves a page, or is actively browsing the custom website 1504. In an embodiment, the engagement service 1524 may be a feature of the co-browsing method described above and may facilitate any of the co-browsing embodiments described above. The engagement service 1524 may run as a script on the custom website 1504. As described above, the engagement service 1524 may capture when a visitor 1502 performs actions such as, for example, connects to the custom website 1504, disconnects from the custom website 1504, goes idle, becomes active, hovers over the default phone number/dynamic phone number field, fills in a form, and/or has actively been navigating on multiple pages of the custom website 1504. The engagement service 1524 may communicate with a visitor engagement module 1530 in the visitor's browser 102 and an operator engagement module 1532 in the operator's browser 1506.

The dynamic phone number 1508 may be allocated according to defined rules. In an embodiment, when a visitor 1502 lands on a custom website 1504 and at least one dynamic phone number is available, the dynamic phone number 1508 may be displayed, possibly by replacing the default phone number. In an embodiment in which a visitor 1502 has been presented a dynamic phone number 1508 in the past and that dynamic phone number 1508 is currently available, that dynamic phone number 1508 may be displayed. In an embodiment in which a visitor has not been presented a dynamic phone number 1508 in the past or the previously presented dynamic phone number 1508 is taken, the dynamic phone number 1508 that has remained unused the longest may be displayed. In an embodiment, a visitor 1502 may be presented with a dynamic phone number 1508 only after the visitor 1502 authenticates his or her identity through the custom website 1504.

When the visitor 1502 disconnects, the dynamic phone number 1508 may be released and become available if the visitor 1502 was on the custom website 1504 for less than a defined length of time, for example, 30 seconds. When a visitor 1502 stays on the custom website 1504 for longer than a defined length of time, for example, 1 minute, the dynamic phone number 1508 for that visitor may be preserved for a set period of time, for example, 20 minutes. When a visitor 1502 goes idle, the dynamic phone number 1508 may be preserved for a set length of time, for example, 20 minutes, before it is released. When a visitor 1502 becomes active, a dynamic phone number 1508 may be reassigned as if the visitor 1502 had first landed on the custom website 1504.

In an embodiment, multiple dynamic numbers 1508 may be grouped into a pool 1512 having no timeout method for allocating dynamic phone numbers to visitors 1502. Using any available information from each the visitor's browser 1502, such as, for example, the visitor's 1502 mouse position, completed forms, browsing speed, and browsing habits, a probability that the visitor 1502 may call the dynamic phone number 1508 may be determined. The probability that the visitor 1502 may call the dynamic phone number 1508 may be used to determine the priority of the visitor 1502 (e.g., the higher the probability, the higher the priority). If the visitor's 1502 priority decreases, the dynamic phone number 1508 originally allocated to that visitor 1502 may be reallocated to another visitor. The visitor 1502 with the decreased priority may be allocated another available dynamic phone number 1508 or presented with the default number for the custom website 1504. The change in phone number may be pushed to visitor's browser 1502 immediately or upon a page refresh or navigation.

In an example, ten visitors 1502 may land on the custom website 1504, and ten dynamic phone numbers 1508 may be allocated. Three visitors 1502 may drop in priority by the probabilistic methods described above. If one new visitor 1502 lands on the custom website 1504, that new visitor may receive the dynamic phone number 1508 originally assigned to one of the three visitors 1502 who received a drop in priority. In an embodiment, the new visitor 1502 may receive the dynamic phone number 1508 of the first visitor 1502 that dropped in priority. In this method, the pool of dynamic numbers 1508 may never run out and a timer is not required for a dynamic phone number 1508 to go back into the pool of available dynamic phone numbers 1508.

In an embodiment, multiple dynamic phone number pools 1512 may be defined, each containing different patterns (e.g., all starting with a certain number or numbers). Information from past and current visitors 1502 may be used to determine from which dynamic phone number pool 1512 a dynamic phone number 1508 should be allocated to a visitor 1502. The visitor information may include details such as, for example, visitor geolocation, visitor account based on information from a client company, the pages a visitor is on, and/or how often a visitor has accessed the custom website 1504 or specific web page.

The back-end service 1510 may send out information about number allocation history 1526 and incoming calls 1528. In an embodiment, the admin panel 1514 may list the dynamic phone numbers 1508 that have been acquired from the phone number provided 1516 for the custom website 1504. In addition, the admin panel 1514 may show whether each dynamic phone number 1508 is currently in allocation and the number of calls that have been made to that number.

The back-end service 1510 may provide real-time metrics. In an embodiment, the back-end service 1510 may send out the total number of dynamic phone numbers 1508 available to the custom website 1504 and the number of dynamic phone numbers 1508 currently allocated to visitors 1502 at every dynamic phone number allocation request. This information may be aggregated in a statistic display provider 1534 to show the usage of the available dynamic phone numbers 1508 (e.g., number of allocated dynamic phone numbers 1508, percentage of allocated dynamic phone numbers 1508). In an embodiment, a graph of this information may be generated. In an embodiment, the back-end service 1510 may send out a metric containing the result of an incoming call after every incoming call. This information may be aggregated in the statistic display provider 1534 to show the results of the calls. In an embodiment in which a co-browsing platform is used, statistics from the co-browsing session may be incorporated as well.

Figure 17:
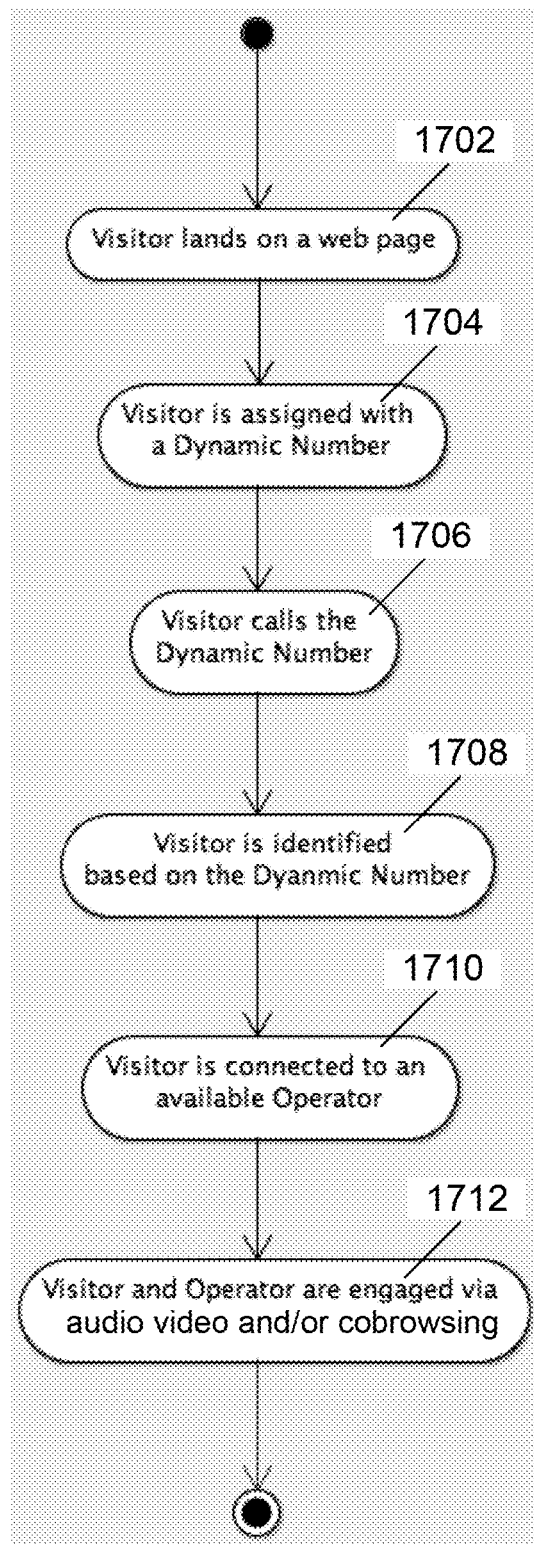
FIGS. 17 and 18 illustrate a method for engaging a visitor to a custom website via a dynamic number.
Figure 18:
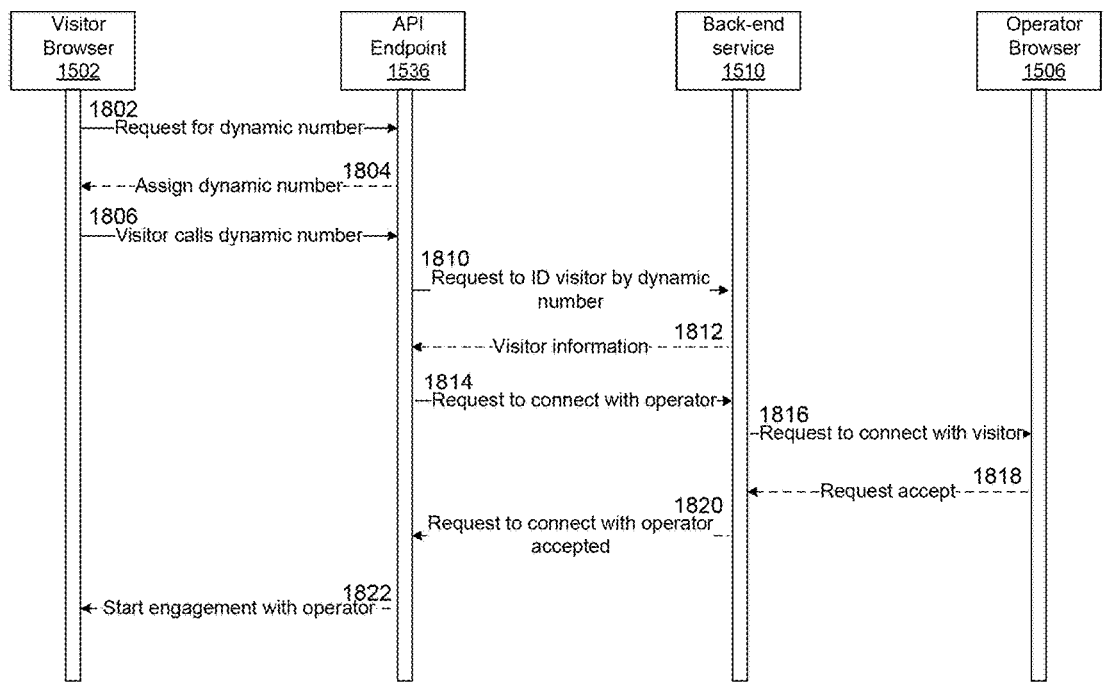

FIGS. 17 and 18 are flowcharts illustrating an embodiment in which a visitor 1502 to a custom website 1504 is identified upon calling a dynamic phone number 1508. FIG. 17 may illustrate the general steps of the process. In step 1702, a visitor 1502 may land on a custom website 1504. In step 1704, the visitor 1704 may be assigned a dynamic phone number 1508. In step 1706. when the phone number provider 1516 receives a call to an allocated dynamic phone number 1508, the phone number provider 1516 may forward the call to an application programming interface (API) endpoint 1536 that was specified during the dynamic phone number 1508 purchase. In step 1708, the API endpoint 1536 may then query the back-end service 1510 to identify the caller. Using the number allocation function 1508 and the allocation history 1526, the back-end service 1510 may compare an allocation table against the dynamic phone number 1508 that was called. If a visitor 1502 is found (i.e., matched to the caller), the identified visitor information may be sent back to the API endpoint 1536. If a visitor 1502 is not found (i.e., not matched to the caller), the back-end service 1510 may return an error to the API endpoint 1536. The API endpoint 1536 may handle the error and not connect the call.

The back-end service 1510 may store information regarding every dynamic phone number allocation to visitors 1502 as well as a record of incoming calls to the dynamic phone numbers 1508 and the originating phone numbers associated with those calls. When finding a visitor 1502 from an incoming call, the back-end service 1510 may try one or more strategies. In an embodiment, it may try to find a previous call to that same dynamic phone number 1508 and determine if the originating phone number matches a previous call to that dynamic number. In another embodiment, the back-end service 1510 may check the current number allocation table against the called dynamic phone number 1508 to look up which visitor 1502, via a visitor ID, to whom the called dynamic phone number 1508 was allocated.

When a visitor 1502 is correctly identified, additional information about the visitor 1502 can be provided. The additional information may include, but is not limited to, name and information from previous calls, notes and recordings from previous calls, information based on the visitor's browser cookies, visitor internet protocol (IP) address, geographic location, visitor device type and configuration, visitor browsing history, previously used search terms, and previously opened emails from the company. In step 1710, the visitor 1502 may be connected to an available operator 1506. In step 1712, the co-browsing, as described above, may be initiated.

FIG. 18 illustrates messaging steps for the process described above. In step 1802, the visitor browser 1502 may send a request for a dynamic number to the API endpoint 1536. This may occur upon the visitor 1502 landing on the custom website 1504, or upon the user 1502 triggering any of the events described above. In step 1804, the API endpoint 1536 may assign the visitor 1502 a dynamic phone number 1508. In step 1806, the visitor 1502 may call the dynamic phone number 1508. The call may be routed to the API endpoint 1536. In step 1810, the API endpoint 1536 may send a request to the back-end service 1510 to identify the visitor 1502 by the assigned dynamic phone number 1508. In step 1812, the back-end service 1510 may send the API endpoint 1536 information about the visitor 1502 obtained through the visitor's 1502 browser information. In step 1814, the API endpoint 1536 may send a request to connect with an operator 1506 to the back-end service 1510. In step 1816, the back-end service 1510 may send a request to connect with the visitor 1502 to the operator 1506. In step 1818, the operator 1506 may send a request acceptance to the back-end service 1510, which may then be forwarded to the API endpoint 1536 in step 1820. In step 1822, the API endpoint 1536 may initiate the engagement/co-browsing session between the visitor 1502 and the operator 1506.

Figure 19:
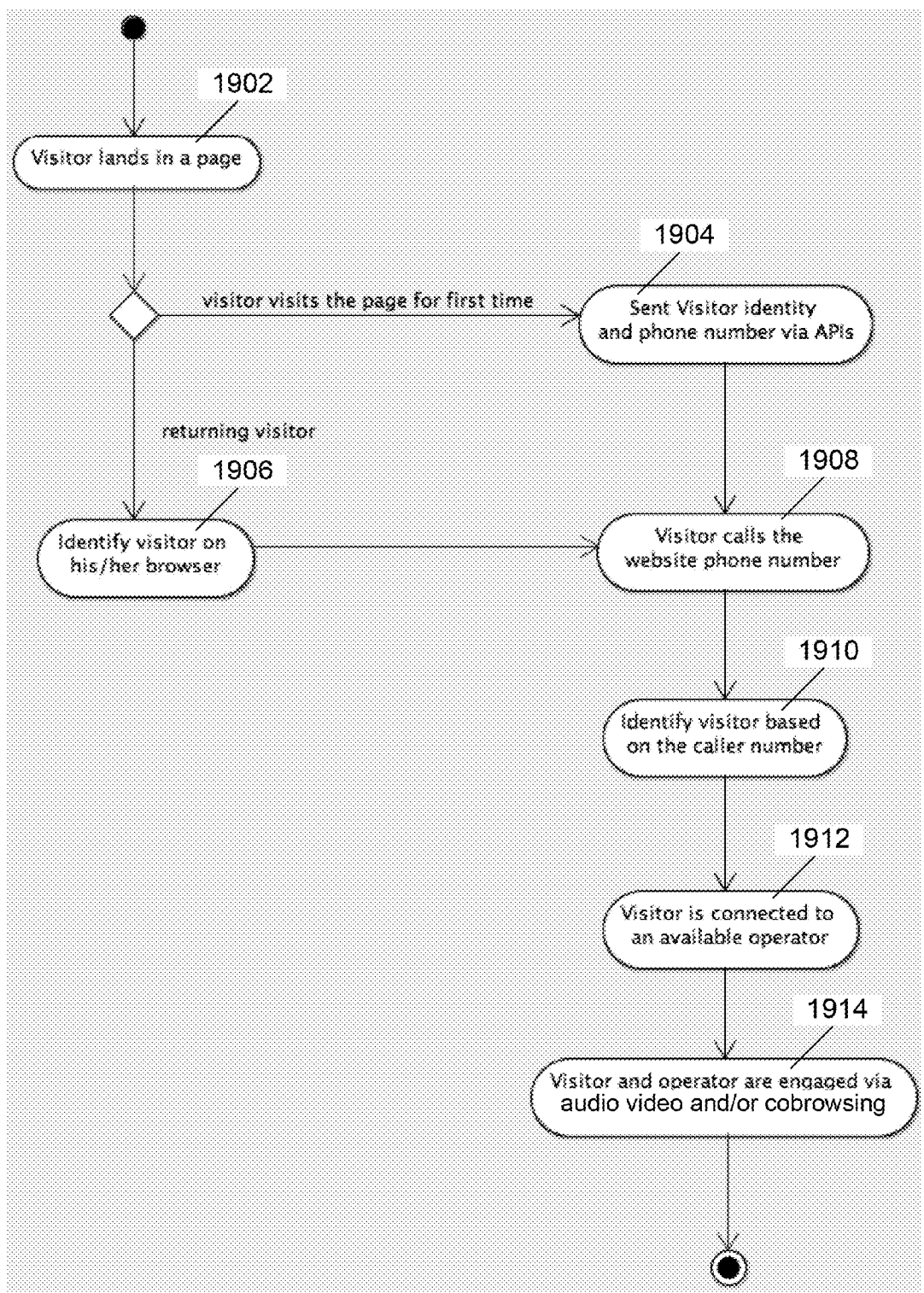
FIGS. 19 and 20 illustrate a method for engaging a visitor to a custom website via a static number.
Figure 20:
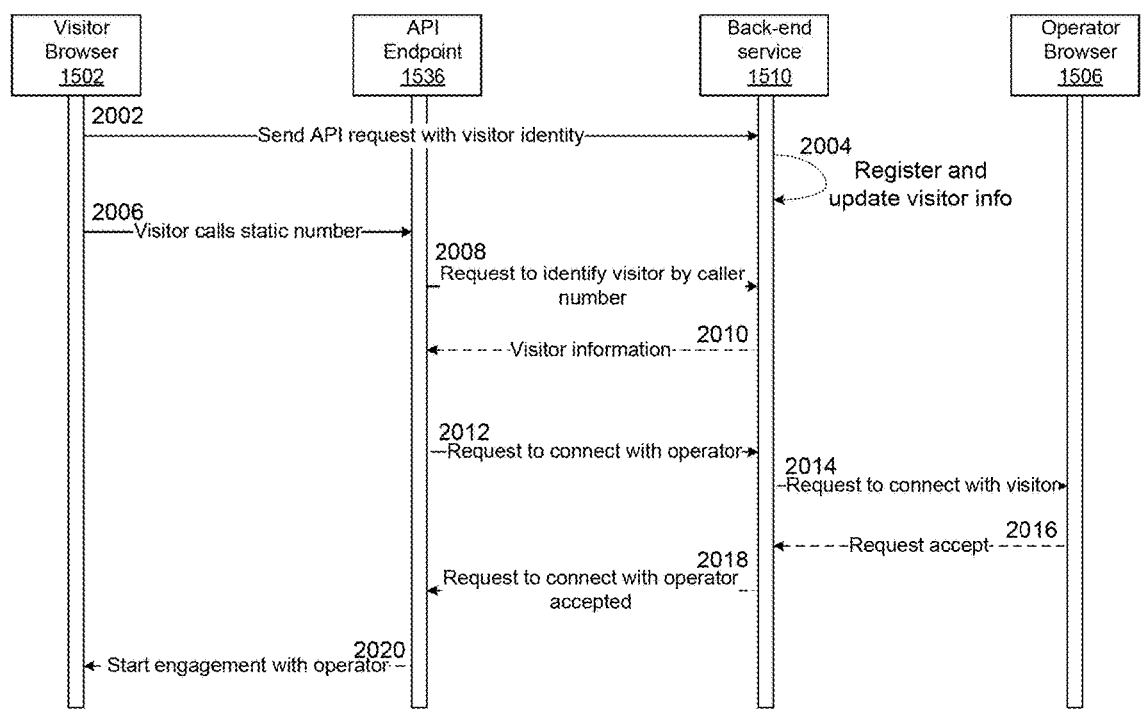

In another embodiment, as shown in FIGS. 19 and 20, the visitor 1502 may be identified when calling the default phone number (i.e., static number) of the custom website 1504 using the visitor's 1502 browsing information. In this embodiment, the visitor 1502 may have an account accessible by the custom web site 1504, the back-end service 1510, and the API endpoint 1536. In an embodiment, the visitor 1502 may sign into the account after landing on the custom website 1504. In another embodiment, the visitor 1502 may already be logged into the account before landing on the custom website 1504 (i.e., the visitor browser allows the visitor to remain logged in). The account may contain information about the visitor 1502, such as, for example, the visitor's name, the visitor's location, the visitor's phone number, as well as information about the visitor's browsing history. When the visitor 1502 calls the static number, the visitor 1502 may be identified by matching the incoming phone number with the phone number associated with the visitor's account.

When a visitor 1502 is identified, the engagement service 1524 may be used to immediately start an in-browser engagement between the visitor 1502 and the operator 1506. In an embodiment, information can be collected preemptively from a visitor 1502 when the visitor lands on the custom website 1504. This information may include, for example, pages the visitor has been on, google search information, and geolocation. The information that is collected preemptively may be general information from the visitor 1502. In an embodiment, information such as the name of the visitor 1502 or any other personally identifiable information (PII) may not be available unless it is provided. In another embodiment, the client operating the custom website 104 may provide some information about the visitor 1502 by making calls to co-browsing APIs. In an embodiment, the operator 1506 may be able to passively observe the visitor's 1502 actions without the visitor 1502 having to call in. The operator 1506 may observe a visitor 1502 as long as the visitor 1502 is actively browsing a page where co-browsing scripts are installed.

In an embodiment, information about the visitor 1502 may be available to the operator 1506 prior to the visitor 1502 calling the dynamic number 1508. Using a co-browsing enabled custom website 1504, the operator 1506 may be able to see a visitor's data and information (including what the visitor 1502 is doing online) and then decide if the operator 1506 would like to accept the engagement or not.

FIG. 19 illustrates the general steps of the process of providing information about the visitor 1502. In step 1902, the visitor may land on the custom website 1504. If the visitor 1504 is landing on the custom website 1504 for the first time, the visitor's identity and associated phone number may be sent to the back-end service 1510 via the API endpoint 1536. In step 1906, if the visitor 1502 is returning to the custom website 1504 (i.e., has been previously identified), the visitor 1502 may be identified by his or her browser information. In step 1908, the visitor 1502 may call the static phone number listed on the custom website 1504. In step 1910, the visitor 1502 may be identified by his or her telephone number. In step 1912, the visitor 1502 may be connected to an available operator 1506. In step 1914, the co-browsing, as described above, may be initiated.

FIG. 20 illustrates messaging steps for the process described above. In step 2002, the visitor 1502 may land on the custom website 1504 and send an API request containing information about the visitor's identity to the back-end service 1510. In step 2004, the back-end service 1510 may register and/or update the visitor information. In step 2006, the visitor 1502 may call the static number listed on the custom website 1504, which may be directed to the API endpoint 1536. In step 2008, the API endpoint 1536 may send a request to identify the visitor 1502 by the visitor's number to the back-end service 1510. In step 2010, the back-end service 1510 may notify the API endpoint 1536 that the visitor 1502 is identified. In step 2012, the API endpoint 1536 may send a request to connect with the operator 1506 to the back-end service 1510. In step 2014, the back-end service 1510 may send a request to connect with the visitor 1502 to the operator 1506. In step 2016, the operator 1506 may send a request acceptance to the back-end service 1510, which may then be forwarded to the API endpoint 1536 in step 2018. In step 2020, the API endpoint 1536 may initiate the engagement/co-browsing session between the visitor 1502 and the operator 1506.

If no suitable operator 1506 is available, the call to the dynamic phone number 1508 may be routed to the default number. In order for the visitor 1502 to communicate with the operator 1506 via the phone call, the operator 1506 may be capable of an audio conversation. In an embodiment, the operator 1506 could use a setup where calls are directed to the operator's phone. In another embodiment, the operator 1506 may use a computer microphone or webcam to provide audio.

When an engagement request comes in, all available audio-capable operators 1506 may be considered. A best suitable operator 1506 may be chosen and paired with a caller based on a variety of conditions. For example, if a visitor 1502 has already spoken with a specific operator 1506 during a previous call, that specific operator 1506 may be chosen. In another example, an operator 1506 with the highest available media (e.g., video, audio, and phone) may be chosen. In an embodiment in which there are multiple available operators 1506 with the same media available, a random operator 1506 may be chosen. In other embodiments, the best operator 1506 may be chosen based on the operator's 1506 available media, geolocation compared to the visitor 1502, number of engagements on the visitor's 1502 current web page or similar web pages, and/or number of calls made in a selected time period. In an embodiment, information about why the visitor 1502 is calling based on their past and current online activity may be gathered before the visitor 1502 calls the dynamic phone number 1508. Therefore, the visitor 1502 may be routed to the most appropriate operator 1506 or alternative (e.g., leave a message).

When an operator 1506 is paired with a visitor 1502, the phone number provider 1516 may be used to create a phone conference call. An engagement can be initiated via the dynamic numbers 1508 without the use of any other pin or code. The incoming call to the dynamic phone number 1508 may be routed to the conference call and the operator 1506 may be joined into the conference call using computer audio input or phone. At this point, the visitor 1502 may be able to freely talk with the operator 1502.

In an embodiment, the visitor 1502 may be assigned a dynamic phone number 1508 only after the visitor 1502 logs into the custom website 1504 and authenticates his or her identity. Upon calling this number, the visitor's 1502 electronic authentication, and possibly the visitor's 1502 information as described above, may be carried through to the operator 1506 by one of the following embodiments described in detail below.

Figure 21:
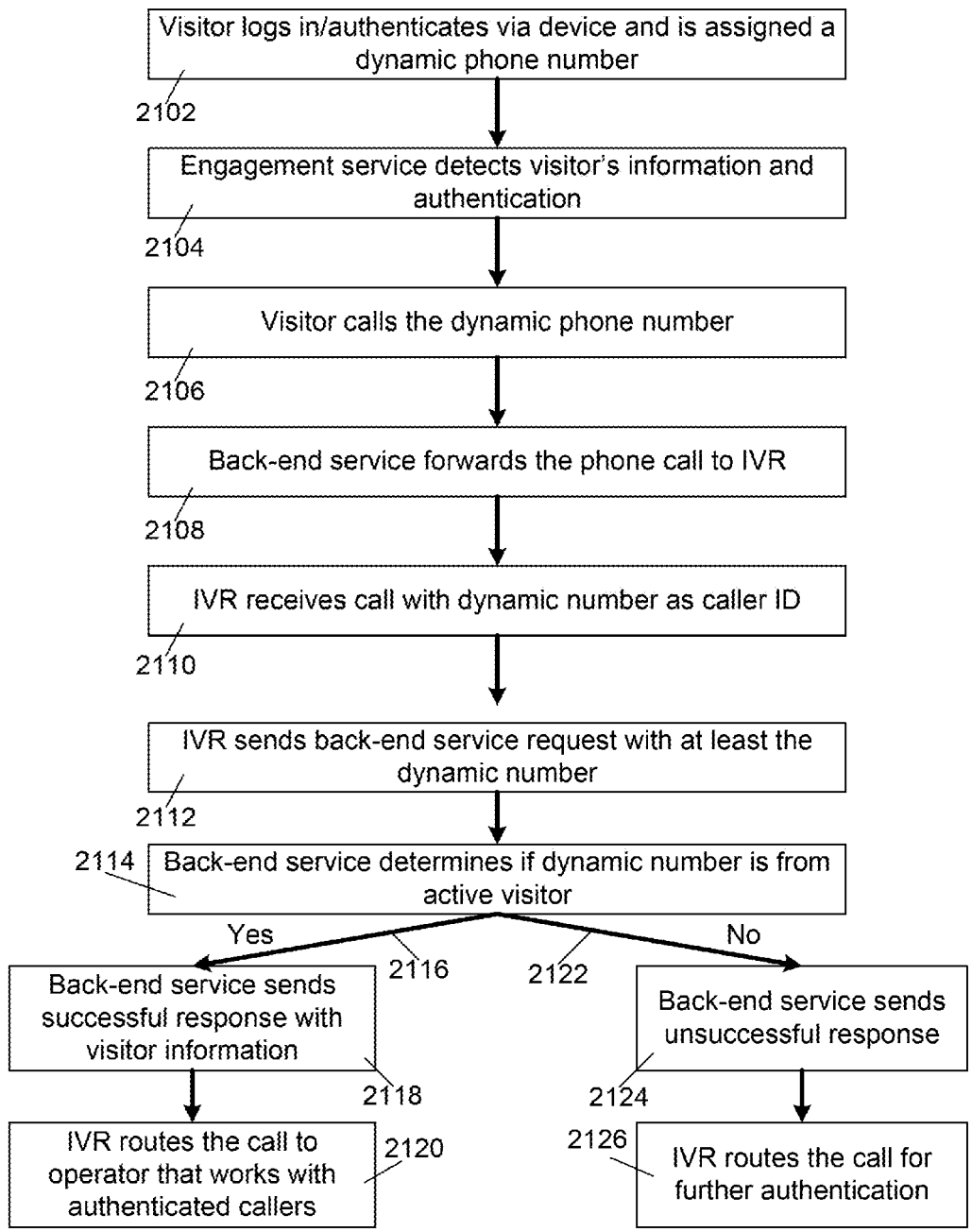
FIGS. 21 and 22 are a flowchart and a diagram, respectively, illustrating a method of device-assisted authentication.
Figure 22:
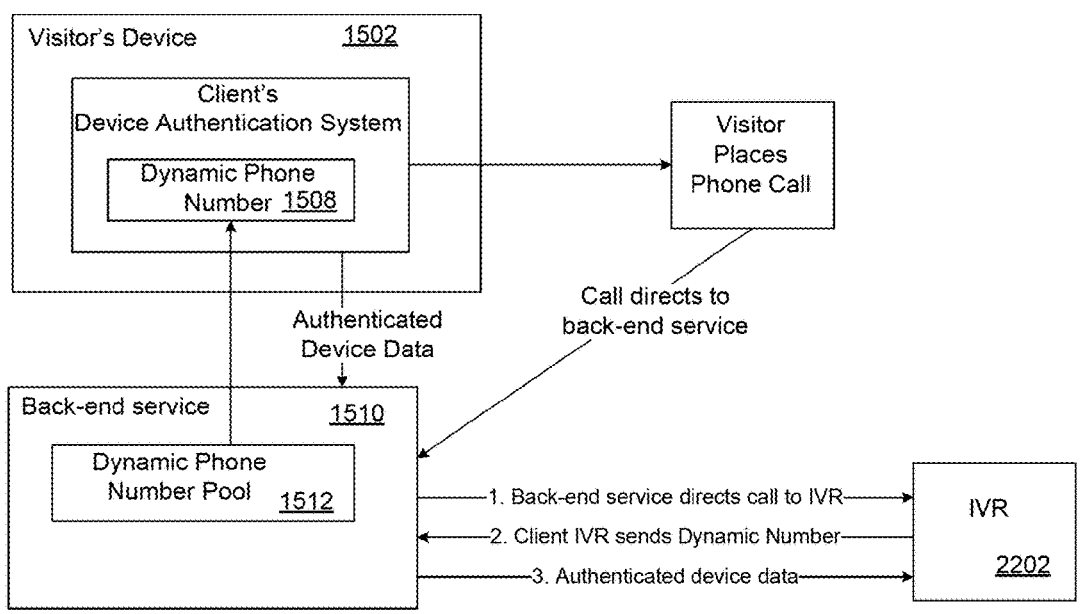

Referring now to FIGS. 21 and 22, a flowchart and a diagram illustrating a method of device-assisted authentication are shown. In step 2102, the visitor 1502 may log in or authenticate his or her identity on the custom website 1504 enabled with the engagement service 1524 as described above with reference to FIG. 15. In step 2104, the engagement service 1524 may detect the visitor's 1502 information and authentication and the messaging service 1520 may assign the visitor a dynamic phone number 1508 that is then displayed in the visitor's browser 1502. In step, 2106 the visitor 1502 may call the dynamic phone number 1508 from the visitor's original number, and the call may be received by the back-end service 1510.

Specifically, when the phone number provider 1516 receives a call to a dynamic phone number 1508, the phone number provider 1516 may forward the call to the API endpoint 1536 that was specified during the dynamic phone number 1508 acquisition or purchase. The API endpoint 1536 may then query the back-end service 1510 to identify the caller/visitor 1502. The back-end service 1510 may compare the allocation table, using the number allocation function 1518 and/or the allocation history 1526, against the dynamic phone number 1508 that was called. If a visitor 1502 is found (i.e., matched to the caller), the identified visitor 1502 information may be sent back to the API endpoint 1536. If a visitor 1502 is not found (i.e., not matched to the caller), the back-end service 1510 may return an error to the API endpoint 1536. The API endpoint 1536 may handle the error and not connect the call.

The back-end service 1510 may store information regarding every dynamic phone number 1508 allocation to visitors 1502 as well as record of incoming calls to the dynamic phone numbers 1508 and the originating phone numbers associated with those calls. When finding a visitor 1502 from an incoming call, the back-end service 1510 may try one or more strategies. In an embodiment, it may try to find a previous call to the dynamic phone number 1508 and determine if the originating phone number matches the previous call to that dynamic number. In another embodiment, it may check the current number allocation table, using the number allocation function 1518 and/or the allocation history 1526, against the called dynamic phone number 1508 and find the visitor 1502, via a visitor ID, to whom the called dynamic phone number 1508 was allocated.

When a visitor 1502 is correctly identified, additional information about the visitor 1502 can be provided. The additional information may include, but is not limited to, name and information from previous calls, information based on the visitor's 1502 browser cookies, visitor internet protocol (IP) address, geographic location, visitor device type and configuration, visitor browsing history, previously used search terms, and previously opened emails from the company.

In step 2108, the back-end service 1510 may forward the call, including information about the dynamic number 1508 and the visitor's 1502 original number, to a phone number associated with a call center. In an embodiment, the call may be forwarded to a call center configured with an Interactive Voice Response system (IVR) 2202. The IVR 2202 may be a conventional IVR system that allows the caller to interact with a host system via a telephone keypad or by speech recognition. It should be noted that in some embodiments, the term IVR 2202 may also refer to web sites, web servers, or systems being used by or in conjunction with the call center. The IVR 2202 may be operated by, or may be associated with, the owner of the custom website. In an embodiment, the back-end service 1510 may forward the call to a phone number of the IVR 2202 set up specifically to receive calls from visitors 1502 the custom website 1504. In another embodiment, the back-end service 1510 may forward the call to a publicly available number for the IVR 2202.

In step 2110, the IVR 2202 may receive the phone call with the dynamic number 1508 as the caller identification (ID), The IVR 2202 may detect the dynamic number 1508 and the caller's original number, as forwarded by the back-end service 1510. In step 2112, the IVR 2202 may send a request to the back-end service 1510 using, for example, a HTTPS protocol. The request may include the dynamic number 1508 and, optionally, the caller's original number. The back-end service 1510 may provide a HTTPS endpoint for the request and may respond with the dynamic number 1508, the original number, and an authentication key.

In step 2114, the back-end service 1510 may use the engagement service to determine if the dynamic number 1508 is from a currently active visitor 1502, from an inactive visitor 1502, or a number not associated with the custom website.

In step 2116, if the back-end service determines that the dynamic number is from a currently active visitor, it may provide the IVR 2202 with a "successful" response in step 2118. In an embodiment, the successful response may be transmitted using a HTTPS protocol. The successful response may include one or more of the following: the visitor's 1502 name, the visitor's 1502 email, the visitor's 1502 original phone number, any notes on the visitor 1502, the visitor's 1502 account number and information, any custom information sent to the browser session by the visitor 1502, and the time of the current active session.

In step 2120, after the IVR 2202 receives the successful response, it may determine from the information that the caller is verified as the visitor 1502 and may route the caller to an operator 1506 that works with pre-authenticated accounts. Because the back-end service 1510 has verified that the visitor 1502 is active and called the dynamic number 1508, the operator 1506 may need to only confirm the caller's name and may not need to ask the caller for any additional security questions. In an embodiment, the operator 1506 may be provided with the information included in the successful response.

In an embodiment, the operator 1506 may be able to engage in co-browsing with the visitor 1502 once the operator receives the call, as described above. Using the co-browsing platform, the operator 1506 may be able to check the browsing behavior of the visitor 1502. For example, the operator 1506 may be able to observe and interact with the visitor's 1502 active browser tab, including the state of dynamic elements, the visitor's 1502 mouse activity and scrolling position, and all the visitor's 1502 tabs that belong to the client company. The engagement functionality may include, but is not limited to: two-way co-browsing between the operator 1506 and the visitor 1502, the visitor 1502 may transition communication with the operator 1506 from the phone used to call the dynamic phone number 1508 to the visitor's 1502 computer microphone, the operator 1506 may send video of the operator 1506 or the operator's screen to the visitor, the visitor 1502 may send video of the visitor 1502 to the operator 1506, and the operator 1506 may transfer the engagement to another available operator 1506.

The operator 1506 may be able to see the visitor's 1502 active browser and may be able to observe what the visitor 1502 is doing on that browser, including mouse activity, scrolling position and any dynamic elements The operator 1506 may be able to see the visitor's 1502 active tab, or may be able to see all of the visitor's 1502 tabs (both active and not active) that belong to the client's web properties. The operator 1506 may be able to see any mapped personal, demographic or buying behavior of the visitor 1502 to the custom website 1504. The information may be, for example, the name of the visitor 1502 and information from prior calls, information from the visitor's 1502 computer cookies, the visitor's 1502 IP address, or the visitor's 1502 device type and device setup.

In step 2122, the back-end service 1510 may determine that the dynamic number 1508 is from an inactive visitor 1502 or if the dynamic number 1508 is not recognized. In step 2124, the back-end service 1510 may provide the IVR 2202 with an unsuccessful response indicating as such. In an embodiment, the unsuccessful response may be transmitted using a HTTPS protocol. Upon receiving the unsuccessful response, the IVR 2202 may route the call to either an automated system or an operator for further authentication in step 2126.

Figure 23:
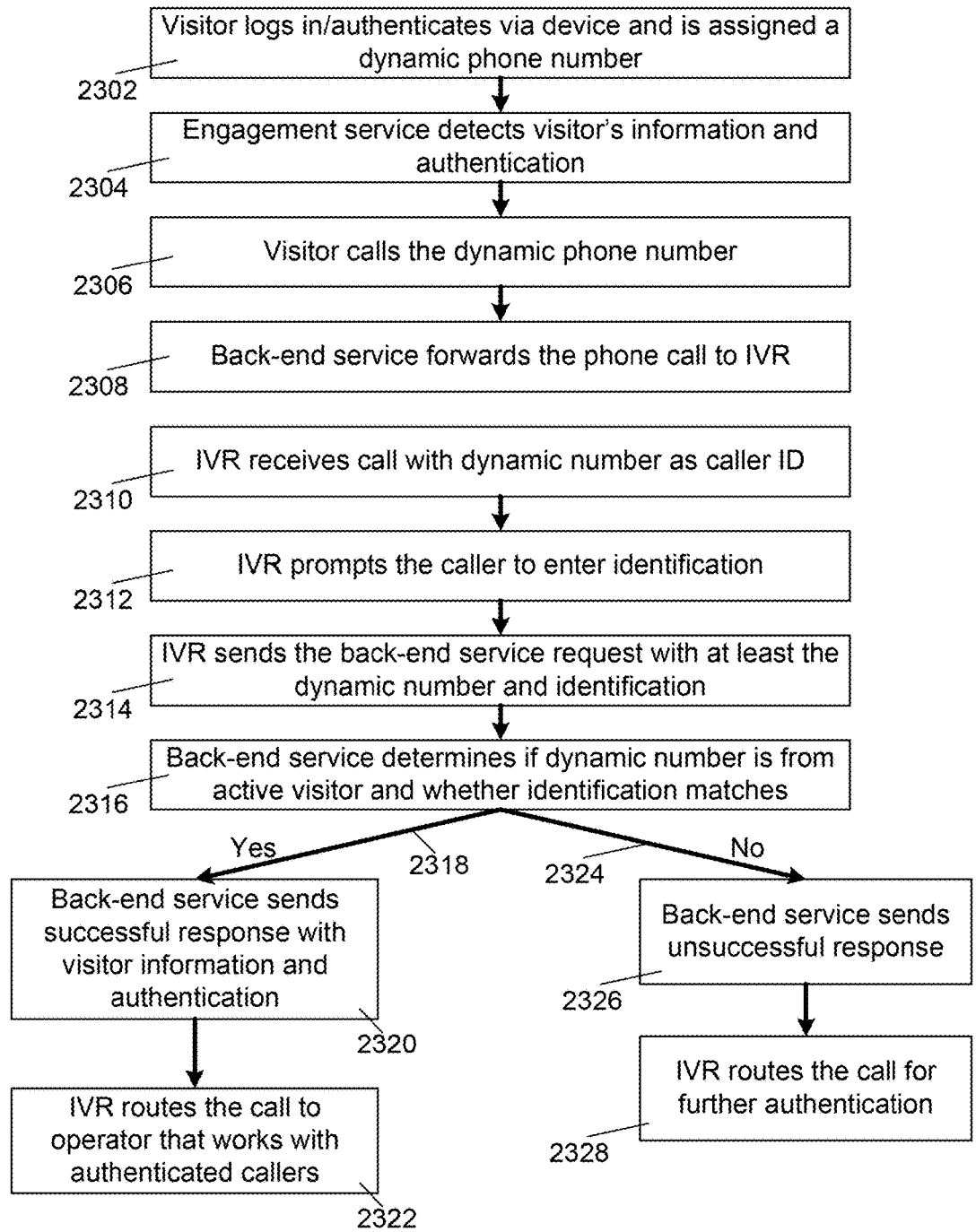
FIGS. 23 and 24 are a flowchart and a diagram, respectively, illustrating another method of device-assisted authentication.
Figure 24:
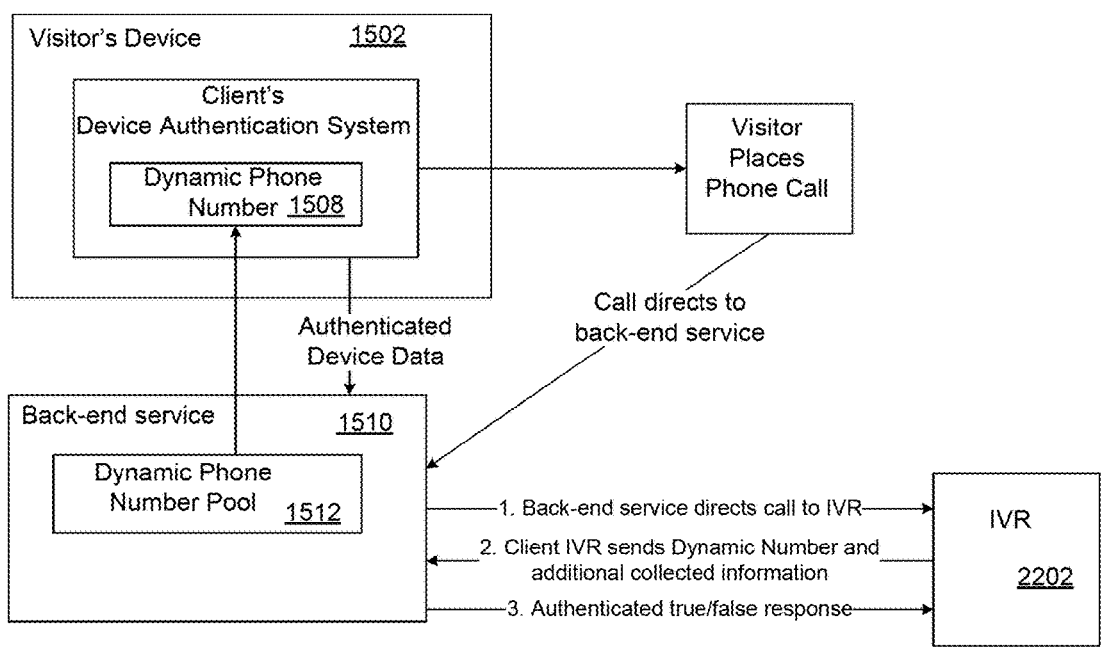

Referring now to FIGS. 23 and 24, a flowchart and a diagram illustrating another method of device-assisted authentication are shown. Unlike the previous method, in which the back-end service 1510 provides the IVR 2202 with information and allows the IVR 2202 to determine if the caller is verified, the following method may include performing the additional verification through the back-end service 1510 itself.

Steps 2302-2310 may similar to steps 2102-2110 as described above with reference to FIG. 23. However, unlike the previous embodiment, in step 2312, the IVR 2202 may prompt the caller to enter an identification through the phone, either by keypad or by voice. The identification may be any type of information that is specific to the visitor 1502, and may be any one or more of the following: an account number, a password, a social security number, a birthdate, and an answer to a predetermined question. In step 2314, the identification may be sent to the back-end service 1510 in a request along with the dynamic number 1508 and the caller's original number.

In step 2316, the back-end service 1510 may use the engagement service 1524 to determine if the dynamic number 1508 is from a currently active visitor 1502, from an inactive visitor 1502, or a number not associated with the custom website 1504.

If the back-end service 1510 determines that the dynamic number 1508 is from a currently active visitor 1502, it may then compare the identification in the request sent by the IVR in step 2314 with the visitor's 1502 browser information. The back-end service 1510 may also take into account how long the visitor's 1502 session has been active. In steps 2318 and 2320, if the back-end service 1510 confirms the identification of the visitor 1502, it may provide the IVR 2202 with a successful response. In an embodiment, the successful response may be transmitted using a HTTPS protocol. The successful response may include one or more of the following: an authentication indicator, the visitor's 1502 name, the visitor's 1502 email, the visitor's 1502 original phone number, any notes on the visitor 1502, the visitor's 1502 account number and information, any custom information sent to the browser session by the visitor 1502, and the time of the current active session.

In step 2322, after the IVR 2202 receives the successful response, including the authentication indication, it may route the caller to an operator 1506 that works with pre-authenticated accounts. Because the back-end service 1510 has verified that the visitor 1502 is active, called the dynamic number 1508, and has entered the correct identification, the operator 1506 may only need to confirm the caller's name and may not need to ask the caller for any additional security questions. In an embodiment, the operator 1506 may be provided with the information included in the successful response. In an embodiment, the operator 1506 may be able to engage in co-browsing with the visitor 1502, as described above.

In steps 2324 and 2326, if the back-end service 1510 determines that the identification provided by the IVR 2202 does not match the browsing session, the dynamic number 1508 is from an inactive visitor 1502, or that the dynamic number 1508 is not recognized, it may provide the IVR 2202 with an unsuccessful response indicating as such. In an embodiment, the unsuccessful response may be transmitted using a HTTPS protocol. In step 2328, upon receiving the unsuccessful response, the IVR 2202 may route the call to either an automated system or an operator 1506 for further authentication.

Figure 25:
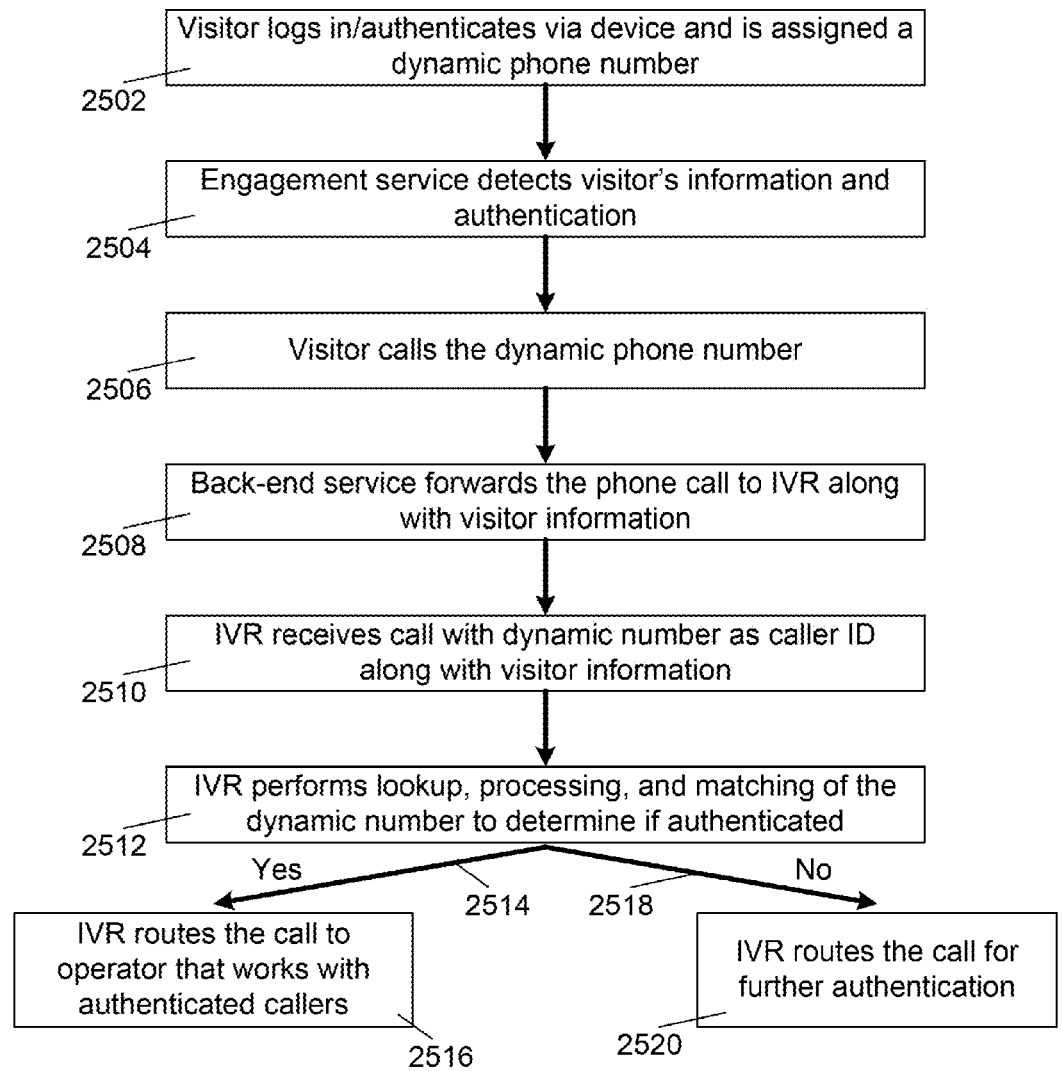
FIGS. 25 and 26 are a flowchart and a diagram, respectively, illustrating another method of device-assisted authentication.
Figure 26:
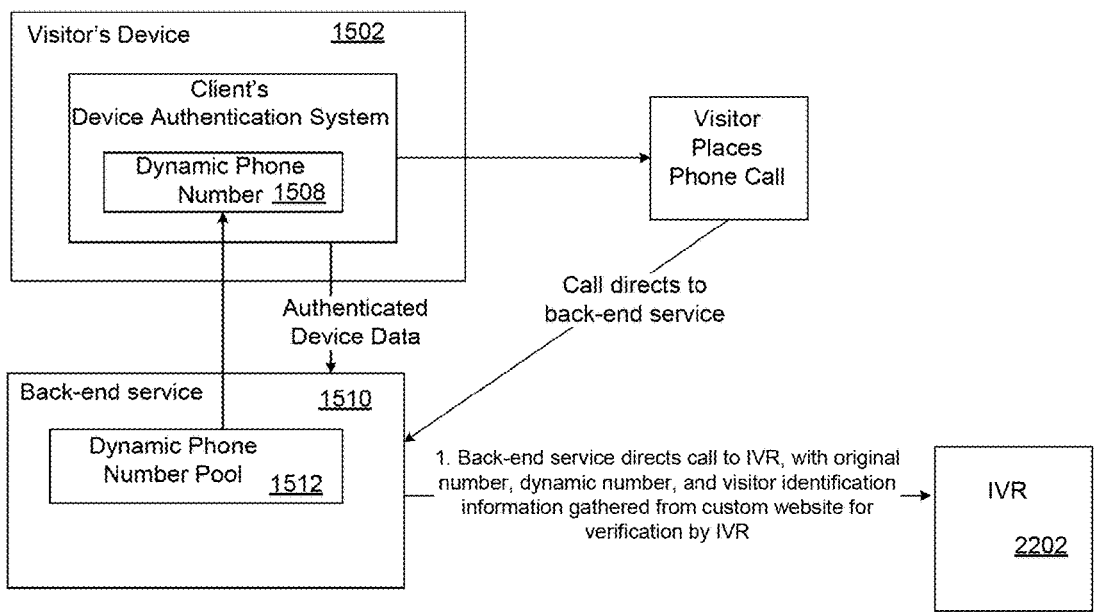

Referring now to FIGS. 25 and 26, a flowchart and a diagram illustrating another method of device-assisted authentication are shown. In an embodiment, rather than waiting for a request for information from the IVR 2202, the back-end service 1510 may send information about the visitor 1502 gathered from the engagement service 1524 and possibly the co-browsing described above with the initial forwarding of the dynamic number 1508 and original number. In other words, the lookup, processing, and matching of the dynamic number 1508 may be performed on the IVR-side rather than in the back-end service 1510.

Steps 2502-2506 may be similar to steps 2102-2106 as described above with reference to FIG. 23. However, step 2508, in addition to forwarding the dynamic number 1508 and the caller's original number, the back-end service 1510 may also initially send the visitor's 1502 information to an endpoint within the IVR 2202. The visitor's 1502 information may be gathered from the engagement service 1524 and may include one or more of the following: the visitor's 1502 name, the visitor's 1502 email, the visitor's 1502 original phone number, any notes on the visitor 1502, the visitor's 1502 account number and information, any custom information sent to the browser session by the visitor 1502, and the time of the current active session.

In step 2510, the visitor's 1502 information may be received with the call information by the IVR 2202 at a registered endpoint that is to be notified for updates about the visitor 1502. The updates may concern general contacts the authorization/authentication information of the user 1502. In an embodiment, the dynamic phone number 1508 may be sent through two separate channels. The dynamic number 1508 and original number may be forwarded to the IVR 2202 once the dynamic number 1508 is called. The visitor's 1502 information and the dynamic number 1508 may be sent via a conventional webhook to the IVR 2202 or to a web site or system maintained by the call center. The call center may match the dynamic number 1508 forwarded in the call from the back-end service 1510 to the dynamic number 1508 received via the webhook to verify the visitor's 1502 authentication.

In an embodiment, the visitor's 1502 information may be pushed to the call center in an event-based fashion. For example, if an event occurs (e.g., a visitor 1502 calling the dynamic number 1508, an engagement session is started or ended, visitor 1502 information is updated by the engagement service 1524, etc.) the back-end service 1510 may forward the call and/or send the updates/information to the registered endpoint in the IVR 2202. The visitor 1502 information may be transmitted using a HTTPS protocol In step 2512, after the IVR 2202 receives the forwarded call and/or visitor 1502 information, it may determine if the dynamic number 1508 is from a currently active visitor 1502, from an inactive visitor 1502, or a number not associated with the custom website 1504.

In steps 2514 and 2516, if the IVR 2202 determines that the dynamic number 1508 is from a currently active visitor 1502, it may determine from the visitor 1502 information that the caller is verified and may route the caller to an operator 1506 that works with pre-authenticated accounts. In an embodiment, the operator 1506 may be provided with the visitor 1502 information. In steps 2518 and 2520, if the IVR 2202 determines that the dynamic number 1508 is from an inactive visitor 1502, or that the dynamic number 1508 is not recognized, it may route the call to either an automated system or an operator 1506 for further authentication.

Figure 27:
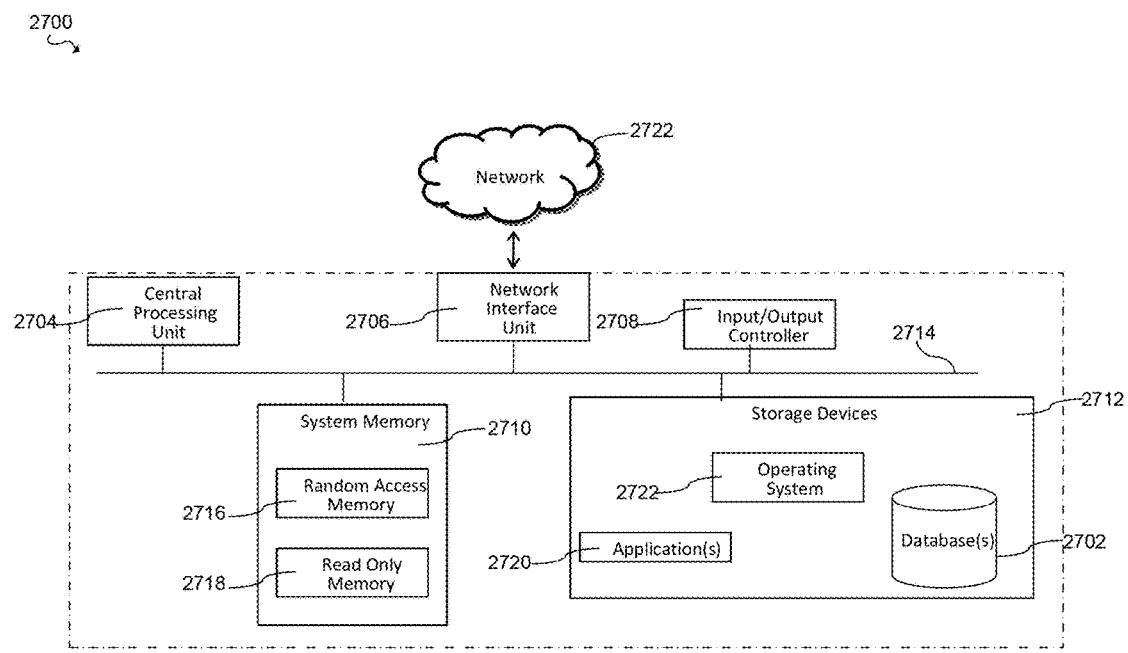
FIG. 27 is component diagram of a host server.

Referring to FIG. 27, a component diagram of a host server 2700 that may be used in any one of the previous embodiments is shown. In an embodiment, any one the back-end service 1510, IVR 2202, or the co-browsing platform may be located on one or more host servers 2700. The host server 2700 may be a conventional stand-alone web server, a server system, a computing cluster, or any combination thereof. In an embodiment, the host server 2700 may include a server, a data warehouse, network, or cloud type storage facility or mechanism that is in communication with the operators and visitors.

In an embodiment, the host server 2700 may include, at least, one or more databases 2702 (hereinafter "databases") for storing the dynamic numbers, dynamic number allocations, and visitor information. In an embodiment, the databases may be a relational database management system managed by Structured Query Language (SQL). In addition, the host server 2700 may include a domain controller (not shown) that authenticates and authorizes the operators to access the back-end service. The domain controller may assign and enforce security policies for all computers, and may be responsible for installing or updating software. In an embodiment, the domain controller may be an Active Directory that makes use of Lightweight Directory Access Protocol (LDAP).

The host server 2700 may include one or more central processing units (CPU) 2704, network interface units 2706, input/output controllers 2708, system memories 2710, and storage devices 2712. Each CPU 2704, network interface unit 2706, input/output controller 2708, system memory 2710, and storage device 2712 may be communicatively coupled via bus 2714.

The system memory 2710 may include random access memory (RAM) 2716, read only memory (ROM) 2718, and one or more cache. The storage devices 2712 may include one or more applications 2720, an operating system 2722, and one or more databases 2702. The storage devices 2712 may take the form of, but are not limited to, a diskette, hard drive, CD-ROM, thumb drive, hard file, or a Redundant Array of Independent Disks (RAID).

The host server 2700 may be accessed by the operators via a network 2722 using a mainframe, thin client, personal computer, mobile device, pad computer, or the like. Information processed by CPU 2704 and/or operated upon or stored on storage devices 2712 and/or in memory 2710 may be displayed to a user through a user device (not shown).

It should be noted that embodiments are not limited to the devices illustrated in FIG. 27. Each device may include any number of disparate hardware and/or software elements, some of which may be located remotely from one another. Functions attributed to one device may be performed by one or more other devices. The devices may communicate with one another (and with other non-illustrated elements) over any suitable communication media and protocols that are or become known.

Figure 28:
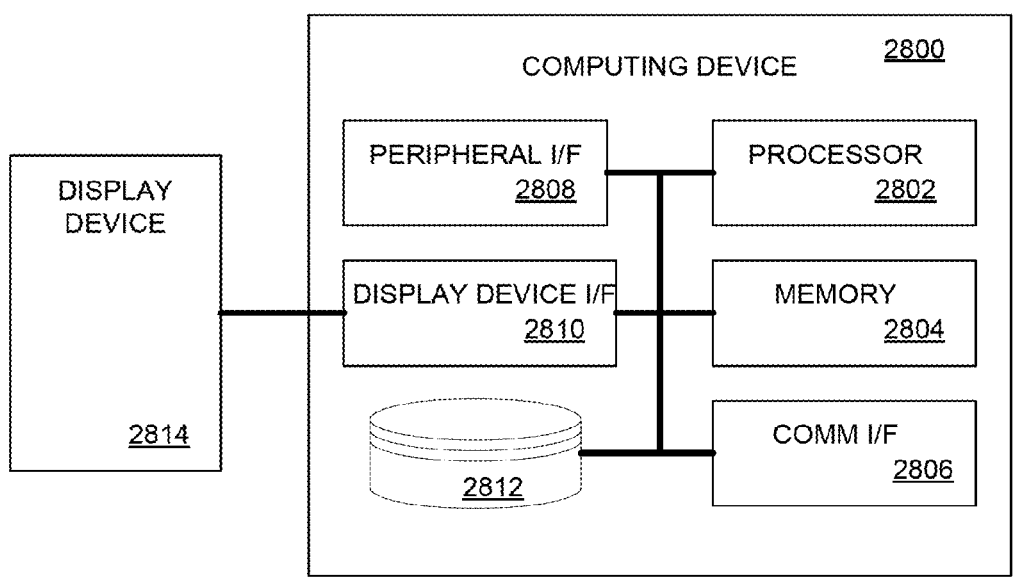
FIG. 28 is a diagram of an example computing device.

Referring now to FIG. 28, an example computing device 2800 that may be used to implement features of the embodiments described above is shown. The computing device 2800 may include a processor 2802, a memory device 2804, a communication interface 2806, a peripheral device interface 2808, a display device interface 2810, and a storage device 2812. FIG. 28 also shows a display device 2814, which may be coupled to or included within the computing device 2800.

The memory device 2804 may be or include a device such as a Dynamic Random Access Memory (D-RAM), Static RAM (S-RAM), or other RAM or a flash memory. The storage device 2812 may be or include a hard disk, a magneto-optical medium, an optical medium such as a CD-ROM, a digital versatile disk (DVDs), or Blu-Ray disc (BD), or other type of device for electronic data storage.

The communication interface 2806 may be, for example, a communications port, a wired transceiver, a wireless transceiver, and/or a network card. The communication interface 2806 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 2808 may be an interface configured to communicate with one or more peripheral devices. The peripheral device interface 2808 may operate using a technology such as Universal Serial Bus (USB), PS/2, Bluetooth, infrared, serial port, parallel port, and/or other appropriate technology. The peripheral device interface 2808 may, for example, receive input data from an input device such as a keyboard, a mouse, a trackball, a touch screen, a touch pad, a stylus pad, and/or other device. Alternatively or additionally, the peripheral device interface 2808 may communicate output data to a printer that is attached to the computing device 2800 via the peripheral device interface 2808.

The display device interface 2810 may be an interface configured to communicate data to display device 2814. The display device 2814 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 2810 may operate using technology such as Video Graphics Array (VGA), Super VGA (S-VGA), Digital Visual Interface (DVI), High-Definition Multimedia Interface (HDMI), or other appropriate technology. The display device interface 2810 may communicate display data from the processor 2802 to the display device 2814 for display by the display device 2814. As shown in FIG. 28, the display device 2814 may be external to the computing device 2800, and coupled to the computing device 2800 via the display device interface 2810. Alternatively, the display device 2814 may be included in the computing device 2800.

An instance of the computing device 2800 of FIG. 28 may be configured to perform any feature or any combination of features described above. In such an instance, the memory device 2804 and/or the storage device 2812 may store instructions which, when executed by the processor 2802, cause the processor 2802 to perform any feature or any combination of features described above. Alternatively or additionally, in such an instance, each or any of the features described above may be performed by the processor 2802 in conjunction with the memory device 2804, communication interface 2806, peripheral device interface 2808, display device interface 2810, and/or storage device 2812.

Although FIG. 28 shows that the computing device 2800 includes a single processor 2802, single memory device 2804, single communication interface 2806, single peripheral device interface 2808, single display device interface 2810, and single storage device 2812, the computing device may include multiples of each or any combination of these components 2802, 2804, 2806, 2808, 2810, 2812, and may be configured to perform, mutatis mutandis, analogous functionality to that described above.

The methods and apparatuses provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of initiating an engagement session between a visitor of a custom website or application and an operator, the method comprising:
    capturing, by a back-end service, one or more user interface (UI) events on the custom website or application initiated by the visitor;
    allocating, by the back-end service, a dynamic phone number that is specific to the visitor based on the one or more UI events;
    displaying, by the back-end service, a dynamic number on the custom website or application, such that is viewable on an internet-enabled device of the visitor;
    receiving, at an application program interface (API) endpoint, a call to the allocated dynamic phone number;
    identifying, by the back-end service, the visitor by the allocated dynamic phone number;
    assigning, by the back-end service, the visitor to an available operator;

providing, by the back-end service, the operator with information about the visitor and the one or more UI events; and connecting, by the back-end service, the visitor to the operator.

2. The method of claim 1, wherein the allocating the dynamic phone number that is specific to the visitor comprises:

assigning a unique dynamic phone number from a list of available dynamic phone numbers, wherein the available dynamic phone numbers are acquired from a phone number provider by the back-end service.

3. The method of claim 1, wherein the allocating the dynamic phone number that is specific to the visitor comprises:

determining that the visitor has been presented a dynamic phone number in the past;

determining that the previously presented dynamic phone number is available; and reserving the previously presented dynamic phone number for the visitor.

4. The method of claim 1, wherein the identifying the visitor by the dynamic phone number comprises:

finding, by the back-end service, a record of a previous call to the dynamic phone number from the visitor; and reusing the visitor information from the previous call.

5. The method of claim 1, wherein the identifying the visitor by the dynamic phone number comprises:

checking, by the back-end service, the dynamic phone number against a dynamic phone number allocation table comprising one or more dynamic phone numbers assigned to a corresponding one or more visitors.

6. The method of claim 1, wherein the connecting the visitor to the operator comprises:

initiating a conference call between the visitor and the operator.

7. The method of claim 1, wherein the connecting the visitor to the operator comprises:

initiating an audio/video communication between the visitor and the operator over the internet-enabled device of the visitor.

8. The method of claim 1, wherein the connecting the visitor to the operator comprises:

initiating a co-browsing session between the visitor and the operator, wherein the operator can observe and interact with the visitor's browsing of the custom website or application.

9. The method of claim 1, wherein the information from the visitor's web browser comprises one or more of the visitor's name and information from previous calls, the visitor's browser cookies, the visitor's internet protocol (IP) address, the visitor's geographic location, the visitor's device type and configuration, the visitor's browsing history, search terms previously used by the visitor, emails affiliated with the web site previously opened by the visitor, third party information about the visitor, and information sent by the client.

10. The method of claim 1, wherein the allocating the dynamic phone number that is specific to the visitor is performed when the visitor lands on the custom website or application.

11. A method of verifying a caller's identity using authentication information provided to an internet-enabled device by the caller, the method comprising:

capturing, by a back-end service, one or more user interface (UI) events on the custom website or application initiated by the caller;

allocating, by the back-end service, a dynamic phone number that is specific to the caller based on the one or more UI events;

displaying, by the back-end service, a dynamic phone number in a custom website or application after the caller's identity has been authenticated through the internet-enable device, wherein the dynamic phone number is displayed only to the caller;

receiving, at an application program interface (API) endpoint, a phone call from the caller's original number to the dynamic phone number;

forwarding, by the back-end service, the caller's original number and the dynamic phone number to an interactive voice response system (IVR);

receiving, by the back-end service, a request for information from the IVR, wherein the request contains at least the dynamic number;

determining, by the back-end service, that the dynamic number is allocated to the caller and that the caller is active; and sending, by the back-end service, a successful response to the IVR containing information from the caller's internet-enabled device to be used for verification of the caller.

12. The method of claim 11, wherein the displaying the dynamic phone number comprises replacing a default phone number displayed on the custom website or application.

13. The method of claim 11, wherein the successful response comprises at least one of the caller's name, the caller's email, the caller's original phone number, any notes on the caller, the caller's account number and information, any custom information sent to the browser session by the caller, and the time of the current active session.

14. The method of claim 11, further comprising:

upon receiving the successful response at the IVR, directing the call to an operator that works with pre-authenticated callers.

15. The method of claim 11, further comprising:

initiating, by the back-end service, a co-browsing session between the caller and the operator, the operator can observe and interact with the caller's browsing of the custom website or application.

16. The method of claim 11, wherein the determining that the dynamic number is allocated to the caller comprises:

checking, by the back-end service, the dynamic phone number against a dynamic phone number allocation table comprising one or more dynamic phone numbers assigned to one or more corresponding visitors callers.

17. The method of claim 11, wherein the allocating the dynamic phone number that is specific to the caller comprises:

assigning a unique dynamic phone number from a list of available dynamic phone numbers, wherein the available dynamic phone numbers are acquired from a phone number provider.

18. The method of claim 11, wherein the caller has a unique identification (ID).

19. A method of verifying a caller's identity using authentication information provided to an internet-enabled device by the caller, the method comprising:

capturing, by a back-end service, one or more user interface (UI) events on the custom website or application initiated by the caller;

allocating, by the back-end service, a dynamic phone number that is specific to the caller based on the one or more UI events;

displaying, by the back-end service, a dynamic phone number in a custom website or application after the caller's identity has been authenticated through the internet-enable device, wherein the dynamic phone number is displayed only to the caller;

receiving, at an application program interface (API) endpoint, a phone call from the caller's original number to the dynamic phone number;

gathering, by the back-end service, the caller's identification information from the caller's activity on the custom website or application based on the allocated dynamic phone number; and forwarding, by the back-end service, the caller's original number, the dynamic phone number, and the caller's identification information to an interactive voice response system (IVR) to perform matching and verification.

* * * * *